United States Patent [19]

Hibino et al.

[11] 4,416,010

[45] Nov. 15, 1983

[54] DOUBLE ERROR CORRECTING SYSTEM IN DIGITAL SIGNAL REPRODUCING APPARATUS

[75] Inventors: Chitoshi Hibino; Harukuni Kobari; Susumu Suzuki, all of Yokohama; Yasuhiro Yamada, Fujisawa, all of Japan

[73] Assignee: Victor Company of Japan, Ltd., Yokohama, Japan

[21] Appl. No.: 254,053

[22] Filed: Apr. 14, 1981

[30] Foreign Application Priority Data

Apr. 14, 1980 [JP] Japan .................................. 55-49004
Apr. 18, 1980 [JP] Japan .................................. 55-51413

[51] Int. Cl.³ .............................................. G06F 11/10
[52] U.S. Cl. ........................................... 371/37; 371/38
[58] Field of Search .......................... 371/37, 38, 39, 40

[56] References Cited

U.S. PATENT DOCUMENTS 3,868,632  2/1975  Hong et al. ................................ 371/34

OTHER PUBLICATIONS

A. M. Patel, Error Recovery Scheme for the IBM 3850 Mass Storage System, IBM J. Res. Develop., vol. 24, No. 1, Jan. 1980, pp. 32-42.

Primary Examiner—Charles E. Atkinson
Attorney, Agent, or Firm—Louis Bernat

[57] ABSTRACT

A double error correcting system is used in a digital signal reproducing apparatus, which is capable of correcting errors in two information vectors (information words) among a plurality of information vectors within one block by use of elements in a small number of correcting matrices and by using a memory device having a small memory capacity. A register is not required for temporarily storing the operational result obtained halfway between a plurality of performed operations. Instead, corrected information vectors are obtained from a memory circuit.

9 Claims, 16 Drawing Figures

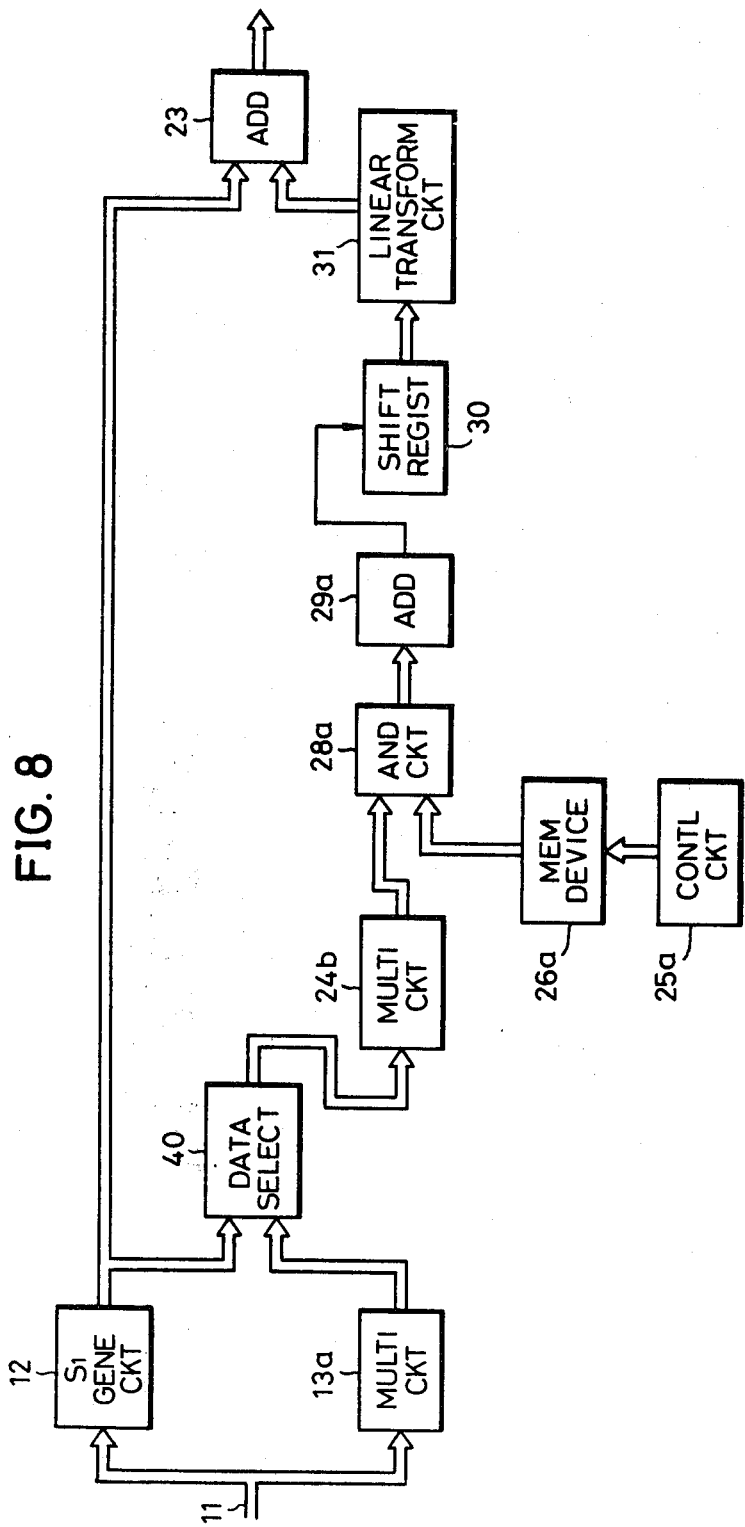

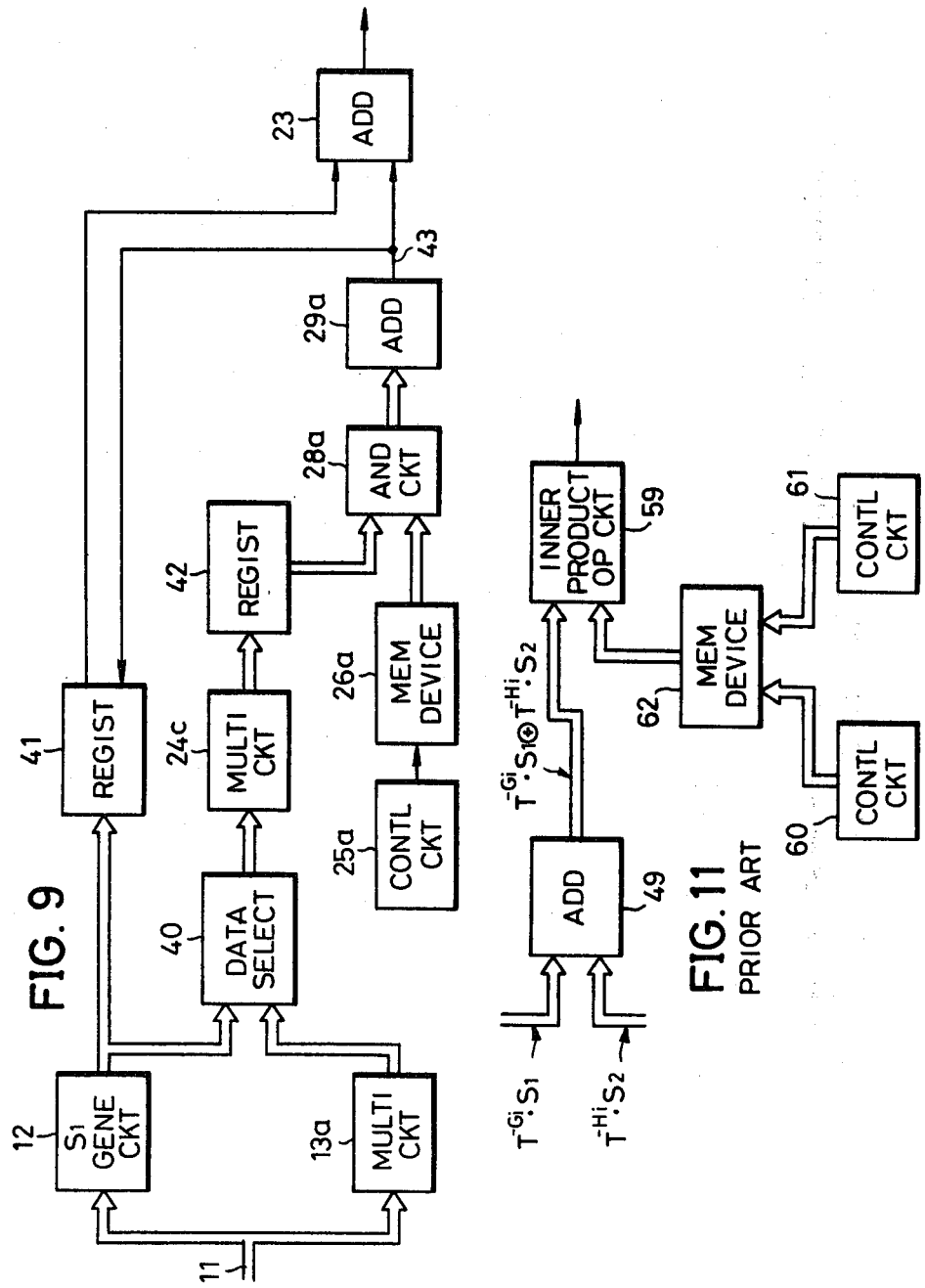

DOUBLE ERROR CORRECTING SYSTEM IN DIGITAL SIGNAL REPRODUCING APPARATUS

BACKGROUND OF THE INVENTION

The present invention relates generally to double error correcting systems in digital signal reproducing apparatuses, and more particularly to a double error correcting system in a digital signal reproducing apparatus, which is capable of correcting errors in two information vectors (information words) among a plurality of information vectors within one block, by use of few number of elements (correcting matrix data) of a correcting matrix, upon detection of two vector (word) errors within one block by using error pointers of adjacent codes during reproduction of digital signals which are transmitted in units of blocks.

Digital signal recording and/or reproducing systems have been recently developed for recording digital signals obtained by digitally modulating sound signals and the like by use of such modulation methods as pulse code modulation (PCM), onto magnetic tapes and discs, and reproducing the digital signals thus recorded. Magnetic recording and/or reproducing apparatuses (VTRs) and disc recording and/or reproducing apparatuses are used in the above recording and reproduction of digital signals, since the occupied bandwidth of the digital signals is wide, however, in this type of a high density recording and/or reproducing system, a plurality of errors are generated in the codes of the digital signals due to scratches and dust particles on the recording medium, dropout of information, jitter, noise, fluctuation in the reproduction level, interferences between codes, and the like. There are two kinds of errors introduced in the digital signal codes, mainly, random errors which are generated in a random manner, and burst errors which are generated in a burst manner, and various code correcting methods have been presented for each of the above kinds of errors.

In a conventional double error correcting system (a system for correcting errors of two or more words) using error pointers of adjacent codes, complex matrix operations are necessary upon correcting double errors. Accordingly, in this type of a conventional system, the elements of the matrices are calculated in advance and stored in a memory device such as a read-only-memory (ROM), and these elements of the matrices are read out and used upon necessity. However, when a ROM device is used, an address counter is required for selectively reading out of the information from the ROM device, and the circuit construction of the error correcting apparatus becomes complex. Furthermore, in a case where the number of elements (the number of bits in one word) in one vector is large, when the number of bits in one word is fourteen and the number of words of digital signals within one block is six, for example, the required minimum memory capacity of the ROM device becomes 980 ($=14 \times 14 \times 5$). However, since the memory capacity of most ROM devices is $2^N$ (N is an integer greater than zero), a plurality of these ROM devices must be used, and the conventional devices were disadvatageous in that the cost of the error correcting apparatus became high.

SUMMARY OF THE INVENTION

Accordingly, a general object of the present invention is to provide a novel and useful double error correcting system in digital signal reproducing apparatus, in which the above described problems have been overcome.

Another and more specific object of the present invention is to provide a double error correcting system in a digital signal reproducing apparatus, which is capable of correcting errors in two information vectors (information words) among a plurality of information vectors within one block by use of elements in a small number of correcting matrices, by using a memory device having a small memory capacity.

Still another object of the present invention is to provide a double error correcting system in a digital signal reproducing apparatus, in which a register for temporarily storing the operational result obtained halfway between a plurality of operations performed is not required, by obtaining corrected information vectors from a memory circuit, and the circuit construction is simplified.

Other objects and further features of the present invention will be apparent from the following detailed description when read in conjunction with the accompanying drawings.

BRIEF DESCRIPTION OF THE DRAWINGS

FIG. 8 is a systematic block diagram showing a third embodiment of a double error correcting system according to the present invention;

FIG. 9 is a systematic block diagram showing a fourth embodiment of a double error correcting system according to the present invention;

FIG. 11 is a systematic block diagram showing an example of an essential part of the conventional system which corresponds to the system of the present invention shown in FIG. 10;

DETAILED DESCRIPTION

Figure 1:
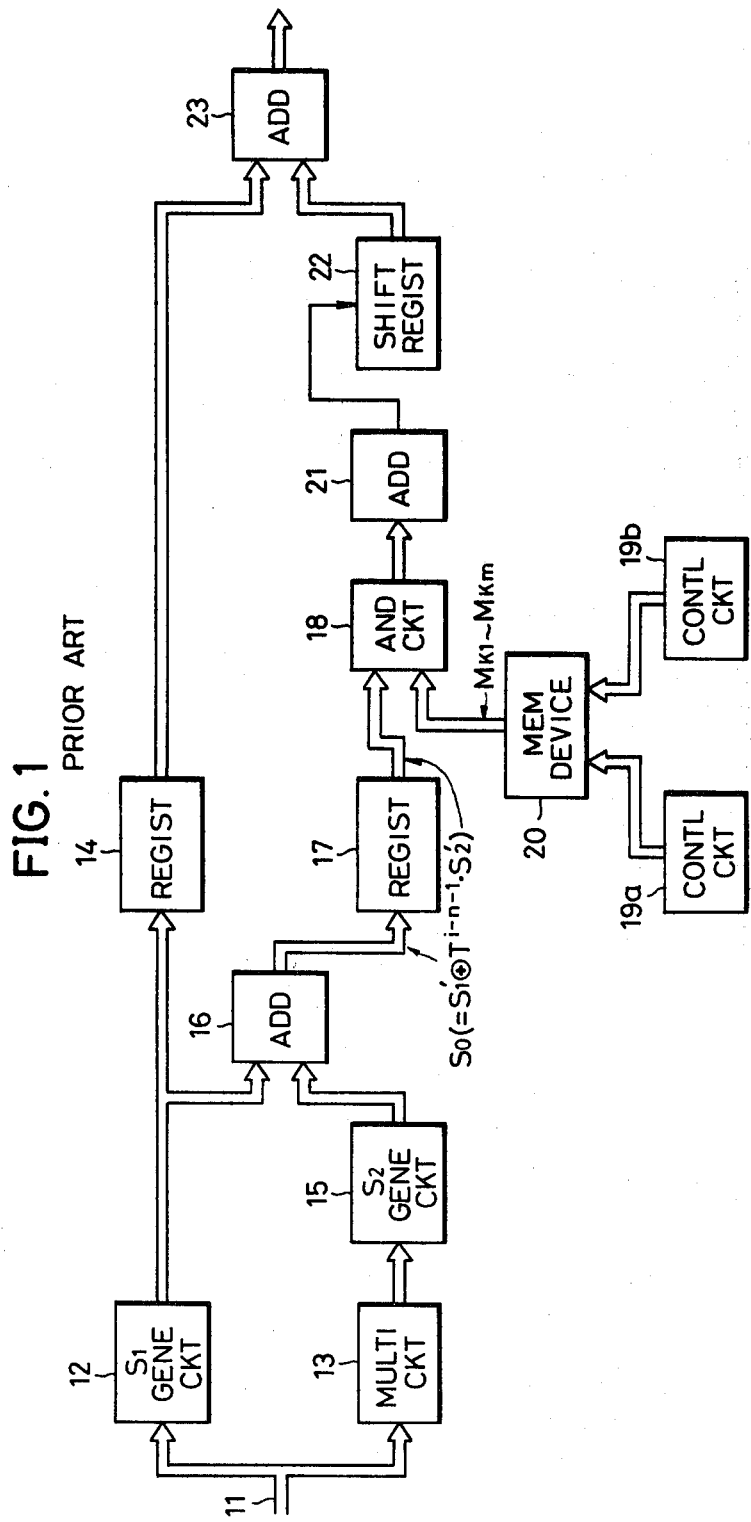
FIG. 1 is a systematic block diagram showing an example of a conventional double error correcting system in digital signal reproducing apparatus.

Since the present invention relates to an apparatus for performing adjacent code correction in which two erroneous vectors are corrected among a plurality of vectors constituting one block, by using error pointers which indicate which vectors (words) are in error, a general description will now be given on the adjacent code correction.

In an adjacent code double error correction, each of m-bit (m is an integer greater than zero) information vectors (also called information words) $W_1$, $W_2$, $W_3$, - - -, $W_n$ (n is an integer) having elements "0" and "1", and two error correcting vectors (also called error correcting words) P and Q which are column vectors and obtained by equations which will be described hereinafter, are used to form blocks, to transmit digital signals in units of these blocks. Correction is performed when errors are detected in two vectors within one block upon receipt of these digital signals by use of error pointers which indicate which vectors are in error. The above error correcting vectors P and Q can be described by the following equations (1) and (2).

$$P = \sum_{l=1}^{n} W_l = W_1 \oplus W_2 \oplus \ldots \oplus W_n \quad (1)$$

(n is an integer)

$$Q = T^n \cdot W_1 \oplus T^{n-1} \cdot W_2 \oplus \ldots \oplus T \cdot W_n \quad (2)$$

(or $T \cdot W_1 \oplus T^2 \cdot W_2 \oplus \ldots \oplus T^n \cdot W_n$)

In the above equations (1) and (2), the symbol "$\Sigma$" indicates the total sum of vectors in GF(2) (GF(2) indicates a finite field comprising two elements), "$\oplus$" indicates an addition of vectors in GF(2), and "T" is a regular linear transformation matrix which is linearly independent from a unit matrix I. The matrix T indicates a companion matrix, for example, of a polynomial $1 + g_1 x + g_2 x^2 + \ldots + x^m$ (m is an integer).

This companion matrix T becomes as follows when the m-order polynomial in GF(2) is $G(x) = x^m + g_{m-1} x^{m-1} + \ldots + g_1 x + g_0$ $$T = \begin{bmatrix} 0 & 0 & \ldots & 0 & g_0 \\ 1 & 0 & 0 & \ldots & 0 & g_1 \\ 0 & 1 & 0 & \ldots & . & . \\ 0 & 0 & 1 & \ldots & . & . \\ . & . & & & . & . \\ . & . & & & 0 & g_{m-2} \\ 0 & 0 & & \ldots & 1 & g_{m-1} \end{bmatrix}$$

The above companion matrix T is defined in the following manner.

That is, by respectively defining the column vectors A and B each having m elements by $A = (a_1, a_2, \ldots, a_m)^t$ and $B = (b_1, b_2, \ldots, b_m)^t$ where t indicates a transpose of a matrix, the following equations are obtained when these vectors A and B are equated to polynomials $$\begin{cases} A(x) = a_m x^{m-1} + a_{m-1} x^{m-2} + \ldots + a_2 x + a_1 \\ B(x) = b_m x^{m-1} + b_{m-1} x^{m-2} + \ldots + b_2 x + b_1 \end{cases}$$

and the result of $x \cdot A(x) \div G(x)$ is assumed to be B(x).

$$B(x) = xA(x) \dot{\ominus} a_m \cdot G_x = x \cdot A(x) \dot{\oplus} a_m \cdot G(x)$$

In the above equation, "$\dot{\oplus}$" and "$\dot{\ominus}$" respectively indicate addition and subtraction between polynomials in GF(2).

Accordingly, the following equation can be formed.

$$B(x) = (a_{m-1} \oplus a_m \cdot g_{m-1}) x^{m-1} + (a_{m-2} \oplus a_m g_{m-2}) x^{m-2} + \ldots + (a_1 \oplus a_m \cdot g_1) x + A_m \cdot g_0$$
$$= b_m \cdot x^{m-1} + b_{m-1} \cdot x^{m-2} + \ldots + b_2 \cdot x + b_1$$

Thus, from the above equation, $b_1 = a_m \cdot g_0$, $b_2 = a_1 \oplus a_m g_1$, ..., $b_m = a_{m-1} \oplus a_m g_{m-1}$, and when these equations are transformed into matrix form, the following matrix equation is formed.

$$\begin{bmatrix} b_1 \\ b_2 \\ . \\ . \\ . \\ b_m \end{bmatrix} = \begin{bmatrix} 0 & 0 & \ldots & 0 & g_0 \\ 1 & 0 & \ldots & 0 & g_1 \\ 0 & 1 & \ldots & . & . \\ . & . & & . & . \\ . & . & & . & . \\ 0 & 0 & & 1 & g_{m-1} \end{bmatrix} \begin{bmatrix} a_1 \\ a_2 \\ . \\ . \\ . \\ a_m \end{bmatrix}$$

Therefore, the equation $B = T \cdot A$ stands. Moreover, since the matrix T must be regular, $g_0$ must be equal to "1". This is due to the fact that when $g_0$ is equal to "0", the first row of the above companion matrix T all become "0", and the companion matrix T does not become a regular matrix.

From the above, the polynomial becomes $G(x) = x^m + g_{m-1} x^{m-1} + \ldots + g_1 x + 1$, however, since the condition upon correction is that a matrix $(I \oplus T^{-k})^{-1}$ (I indicates an m by m unit matrix) exists as will be described hereinafter, the matrix $(I \oplus T^{-k})$ must be regular, and the unit matrix I and the matrix $T^{-k}$ thus must respectively be linearly independent matrices. Accordingly, the condition on the polynomial G(x) is that at least one of the coefficients $g_{m-1}$ through $g_1$ is not "0", and that T, $T^2$, - - - , $T^{n-1}$ respectively are linearly independent of the matrix I.

Returning to equations (1) and (2), the following equation (3) can be obtained by rewriting these equations (1) and (2).

$$P \oplus W_1 \oplus W_2 \oplus \ldots \oplus W_n = \phi$$

$$Q \oplus T^n \cdot W_1 \oplus T^{n-1} \cdot W_2 \oplus \ldots \oplus T \cdot W_n = \phi \quad (3)$$

(or $Q \oplus T \cdot W_1 \oplus T^2 \cdot W_2 \oplus \ldots \oplus T^n \cdot W_n = \phi$)

Therefore, this equation (3) stands when no error exist. In the above equation (3), "$\phi$" indicates a column vector in which m elements are all "0".

However, in a case where two information vectors, mainly, the i-th information vector $\hat{W}_i$ and the j-th information vector $\hat{W}_j$, are in error, and become equal to $w_i$ and $w_j$ as shown in equation (4), the above equation (3) becomes equivalent to the following equation (5).

$$\left.\begin{array}{l}\hat{W}_i = W_i + E_i \\ \hat{W}_j = W_j + E_j\end{array}\right\} \qquad (4)$$

($E_i$ and $E_j$ indicate erroneous vectors, where i and j are integers)

$$\left.\begin{array}{l}S_1 = P \oplus W_1 \oplus W_2 \oplus \ldots \oplus \hat{W}_i \oplus \ldots \oplus \hat{W}_j \oplus \ldots \oplus W_n \\ \quad = E_i \oplus E_j \\ S_2 = Q \oplus T^n \cdot W_1 \oplus T^{n-1} \cdot W_2 \oplus \ldots \oplus T^{n+1-i} \cdot \hat{W}_i \oplus \\ \quad \ldots \oplus T^{n+1-j} \cdot \hat{W}_j \oplus \ldots \oplus T \cdot W_n \\ \quad = T^{n+1-i} \cdot E_i \oplus T^{n+1-j} \cdot E_j \\ \text{(or } S_2 = T^i \cdot E_i \oplus T^j \cdot E_j\text{)}\end{array}\right\} \qquad (5)$$

In the above equation (5), terms $S_1$ and $S_2$ respectively indicate partial syndromes. Hence, the above described erroneous vectors $E_i$ and $E_j$ can be described by the following equation (6) by using the partial syndromes $S_1$ and $S_2$.

$$\left.\begin{array}{l}E_j = (I \oplus T^{i-j})^{-1} \cdot (S_1 \oplus T^{i-n-1} \cdot S_2) \\ \text{(or } E_j = (I \oplus T^{j-i})^{-1} \cdot (S_1 \oplus T^{-i} \cdot S_2)) \\ E_i = S_1 \oplus E_j \\ \text{($I$ indicates an $m$ by $m$ unit matrix)}\end{array}\right\} \qquad (6)$$

Accordingly, by calculating the partial syndromes $S_1$ and $S_2$ from the equation (6), and substituting the values obtained into equation (4), the correct i-th information vector $W_i$ and the correct j-th information vector $W_j$ can respectively be calculated and restored.

In the above, the erroneous information vectors were added when obtaining the partial syndromes $S_1$ and $S_2$ in equation (5). However, when the erroneous information vectors are assumed to be zero vectors and added (the result is the same as that when nothing is added), the partial syndromes $S'_1$ and $S'_2$ respectively become as shown in the following equations (7) and (8).

$$\begin{array}{ll}S'_1 = W_1 \oplus W_2 \oplus \ldots \oplus \phi \oplus \ldots \oplus \phi \oplus \ldots \oplus W_n \oplus P & (7) \\ \quad = W_i \oplus W_j \\ S'_2 = T^n \cdot W_1 \oplus \ldots \oplus \phi \oplus \ldots \oplus \phi \oplus \ldots \oplus T \cdot W_n \oplus Q & (8) \\ \quad = T^{n+1-i} \cdot W_i \oplus T^{n+1-j} \cdot W_j \\ \text{(or } S'_2 = T^i \cdot W_i \oplus T^j \cdot W_j\text{)}\end{array}$$

From these equations (7) and (8), the following equations (9) and (10) can be calculated, and by performing similar operations as those used in calculating the erroneous vectors $E_i$ and $E_j$, the i-th information vector $W_i$ and the j-th information vector $W_j$ can respectively be calculated directly.

$$(I \oplus T^{i-j}) \cdot W_j = S'_1 \oplus T^{i-n-1} \cdot S'_2 \triangleq S_0 \qquad (9)$$

$$\left.\begin{array}{l}W_j = (I \oplus T^{i-j})^{-1} \cdot (S'_1 \oplus T^{i-n-1} \cdot S'_2) \\ \text{(or } W_j = (I \oplus T^{j-i})^{-1} \cdot (S'_1 \oplus T^{-1} \cdot S'_2)') \\ W_i = S'_1 \oplus W_j\end{array}\right\} \qquad (10)$$

Furthermore, when the information vectors $W_1$ through $W_n$ and the error correcting vectors P and Q are respectively of m elements (m bits), the matrices $(I \oplus T^{i-j})^{-1}$ or $(I \oplus T^{j-i})^{-1}$ become m by m matrices.

Moreover, when the error correcting vectors P and Q are generated from the following equation (11), the partial syndromes $S_1$ and $S_2$ are respectively defined as follows when the information vectors $W_i$ and $W_j$ are detected as being in error.

$$\left.\begin{array}{l}P = T^{G1} \cdot W_1 \oplus T^{G2} \cdot W_2 \oplus \ldots \oplus T^{Gn} \cdot W_n \\ Q = T^{H1} \cdot W_1 \oplus T^{H2} \cdot W_2 \oplus \ldots \oplus T^{Hn} \cdot W_n\end{array}\right\} \qquad (11)$$

$$\begin{cases} S_1 = T^{Gi} \cdot W_i \oplus T^{Gj} \cdot W_j \\ S_2 = T^{Hi} \cdot W_i \oplus T^{Hj} \cdot W_j \end{cases}$$

The partial syndromes $S_1$ and $S_2$ can be obtained by multiplying $T^{Gk}$, $T^{Hk}$ and the like with vectors $W_1$ through P or $W_1$ through Q, among the information vectors $W_1$ through $W_n$ and error correcting vectors P and Q excluding the vectors $W_i$ and $W_j$ the error pointers are indicating.

$$S_1 = T^G \cdot W_1 \oplus \ldots \oplus \phi \oplus \ldots \oplus \phi \oplus \ldots \oplus P$$

$$S_2 = T^H \cdot W_1 \oplus \ldots \oplus \phi \oplus \ldots \oplus \phi \oplus \ldots \oplus Q$$

In the above equations, "$\phi$" are parts of the vectors $W_i$ and $W_j$, and the vectors $W_i$ and $W_j$ can be corrected and restored in the following manner.

$$T^{-Gi} \cdot S_1 = W_i \oplus T^{Gj-Gi} \cdot W_j \qquad (12)$$

$$W_i = T^{-Hi} \cdot S_2 \oplus T^{Hj-Hi} \cdot W_j \qquad (13)$$

By substituting equation (13) into equation (12), $$T^{-Gi} \cdot S_1 = T^{-Hi} \cdot S_2 \oplus (T^{Gj-Gi} \oplus T^{Hj-Hi}) \cdot W_j$$

$$W_j = (T^{Gj-Gi} \oplus T^{Hj-Hi})^{-1} \cdot (T^{-Gi} \cdot S_1 \oplus T^{-Hi} \cdot S_2) \qquad (14)$$

By defining $(T^{Gj-Gi} \oplus T^{Hj-Hi})$ in equation (14) as a matrix $M_{Gj-Gi}$, and defining the vector $(T^{-Gi} \cdot S_1 \oplus T^{-Hi} \cdot S_2)$ as $S_0$, the vector $W_j$ can be obtained by multiplying the matrix $M_{Gj-Gi}$ with the column vector $S_0$ by using equation (14), and the vector $W_i$ can be calculated from the following equation (15).

$$W_i = T^{-Gi} \cdot S_1 \oplus T^{Gj-Gi} \cdot W_j \qquad (15)$$

In the present specification, however, description will be given in a case where the error correcting vectors P and Q are generated by use of equation (3), to simplify the description.

Next, the method for generating error pointers will be described. As one method for generating the error pointers, the envelopes of the signals (PCM signals which are modulated by systems such as NRZ and MFM) corresponding to each vector are detected upon reception of each vector of the information vectors $W_1$ through $W_n$ and the error correcting vectors P and Q, and the error pointers are obtained by assuming the received vector to be an erroneous vector when the signal level deviates from a predetermined level. A second method for generating the error pointers is to separate and arrange each vector in the information vectors $W_1$ through $W_n$ and the error correcting vectors P and Q, within (n+2) differing block signals, to obtain error pointers by assuming the vectors within the erroneous block to be in error, by adding error detecting vectors such as CRCC for each block upon transmission, and performing error detection in units of blocks upon reception.

The above described adjacent code correction using error pointers, were conventionally performed by use of a circuit shown in FIG. 1. In FIG. 1, the information vectors $W_1$ through $W_n$ and the error correcting vectors P and Q are respectively and successively supplied to a partial syndrome $S_1$ generating circuit 12 and a multiplying circuit 13 which multiplies $T^{-n-1}$ to the signal supplied thereto, through an input terminal 11. This partial syndrome $S_1$ generating circuit 12 is a circuit for calculating the partial syndrome $S'_1$ in equation (7). In the example shown in FIG. 1, the operation is performed in a parallel manner, and the generating circuit 12 is constructed from m exclusive-OR circuits and m registers. Thus, when a correcting operation is to be performed on a following block before the correcting operation on a preceding block is completed, a parallel output $(W_i \oplus W_j)$ is temporarily stored into a register 14 before the calculation of the partial syndrome $S'_1$ of the following block is started.

On the other hand, the input signal supplied to the input terminal 11 is multiplied by $T^{-n-1}$ at the multiplying circuit 13 which is constructed from exclusive-OR circuits, and then applied to a circuit 15 for generating a deformed partial syndrome $S_2$ (referred to as a partial syndrome $S_2$ generating circuit from hereinafter). The generating circuit 15 is constructed from m registers (edge trigger type flip-flops) and (m+1) or more exclusive-OR circuits. When the flip-flop (register) is initially in a cleared state, the parallel input is obtained as it is upon reception of the first clock pulse CK, and the first vector is multiplied by T upon reception of the following clock pulse CK, to add the parallel input vectors. As a result, the relationship between the signal at the input terminal 11, the output of the multiplying circuit 13, and the output of the generating circuit 15 becomes as shown in the following table.

TABLE

| Output of input terminal 11 | Output of multiplying circuit 13 | Output of generating circuit 15 |
|---|---|---|
| $W_1$ | $T^{-n-1} \cdot W_1$ | $T^{-n-1} \cdot W_1$ |
| $W_2$ | $T^{-n-1} \cdot W_2$ | $T^{-n-1} \cdot (T \cdot W_1 \oplus W_2)$ |
| $W_3$ | $T^{-n-1} \cdot W_3$ | $T^{-n-1} \cdot (T^2 \cdot W_1 \oplus T \cdot W_2 \oplus W_3)$ |
| . | . | . |
| . | . | . |
| . | . | . |
| $W_n$ | $T^{-n-1} \cdot W_n$ | $T^{-n-1} \cdot (T^{n-1} \cdot W_1 \oplus \ldots \oplus W_n)$ |
| P | $T^{-n-1} \cdot P$ | $T^{-n-1} \cdot (T^{n-1} \cdot W_1 \oplus \ldots \oplus W_n)$ |
| Q | $T^{-n-1} \cdot Q$ | $T^{-n-1} \cdot (T^n \cdot W_1 \oplus \ldots \oplus Q) = T^{-n-1} \cdot S_2$ |

Moreover, during the time the error correcting vector P is supplied as input, the clock pulse CK is not applied to the generating circuit 15, and thus, the output of the generating circuit 15 does not vary.

Next, when i clock pulses are applied to the generating circuit 15 shown in FIG. 1 respective to the errors in the vectors $W_i$ and $W_j$, and when the signal at the input terminal is set at $\phi$, the output of the generating circuit 51 becomes as follows.

$$T^i \cdot T^{-n-1} \cdot S'_2 = T^{i-n-1} \cdot S'_2$$

This output thus obtained, is applied to an adder 16 wherein the output thus applied is added to the output $S'_1$ of the generating circuit 12. Accordingly, the following result can be calculated.

$$S_0 = S'_1 \oplus S^{i-n-1} \cdot S'_2$$

In a case where the correcting operation is to be started on a following block before the correcting operation on a preceding block is completed, the output $S_0$ of this adder 16 is temporarily stored within a register 17, and then applied to an AND circuit 18 wherein the multiplication of $S_0$ and a matrix $(I \oplus T^{i-j})^{-1}$ which is respective of the erroneous vectors $W_i$ and $W_j$, is performed.

On the other hand, each data of the m by m matrix $(I \oplus T^{-k})^{-1} = M_k$ ($k = k - i$) is calculated in advance, and the calculated result is stored within a memory device (a ROM device, for example) 20, and a matrix $M_k$ (k is an integer) of the matrices $M_1$ through $M_{n-1}$ is selected by a control circuit 19a. Furthermore, the first through the m-th row of the matrix $M_k$ are successively selected by a control circuit 19b. Hence, the output $(I \oplus T^{i-j})^{-1}$ of the memory device 20 which is controlled by the control circuits 19a and 19b, and the output $(S'_1 \oplus T^{i-n-1} \cdot S'_2)$ of the register 17, are respectively multiplied in terms of bits at the AND circuit 18, and an addition of GF(2) is performed in an adder 21. Accordingly, each element of the information vector $W_j$ which is calculated at the adder 21 according to equation (9), is successively produced as an output serial signal according to the selection of rows in the matrix $M_k$. This serial signal undergoes a serial-to-parallel conversion at a shift register 22, and then applied to one terminal of an adder 23.

The data $(W_i \oplus W_j)$ which is stored within the register 14 is applied to the other terminal of the adder 23, and the information vector $W_i$ which is calculated in accordance with the equation $W_i \oplus W_j \oplus W_j = W_i$ is produced as output from the adder 23. In addition, a zero vector is applied to the adder 23 from the shift register 22, by clearing the register 14 after completion of a predetermined transmission of the vector $W_i$ (or by clearing the generating circuit 15 in a case where the correction of a following block is performed after the correction of the preceding block is completed, since the registers 14 and 17 are not required in this case). Thus, the corrected and restored vector $W_j$ which is applied to the other input terminal of the adder 23, is supplied as it is from the output terminal of the adder 23.

As described above, in the conventional double error correcting system, all the elements of the matrix $M_k = (I \oplus T^{-k})^{-1}$ were stored into the memory device 20, however, since the matrix $M_k$ is an m by m matrix, and furthermore because $k = j - i$, the maximum value of k becomes five in a case where the above described vectors $W_1$ through $W_n$ and P and Q respectively are fourteen bits, and $n = 6$. Therefore, the required minimum memory capacity of the memory device 20 becomes 980 ($= 14 \times 14 \times 5$). However, the memory capacity of most ROM devices is $2^N$ where N is an integer, and thus, a ROM device having an increased memory capacity must then be used. Furthermore, the cost of ROM devices is high compared with that of logic elements, and since the control circuits 19a and 19b shown in FIG. 1 are required, the conventional system was disadvantageous in that the cost of the system became high.

Furthermore, in the conventional system, the corrected data is directly transmitted to a digital-to-analog (D/A) converter (not shown), and thus, it is difficult to finish all the operations immediately when the need arises from the D/A converter. Accordingly, it was necessary to store the intermediate operational results in the registers 14 and 17.

The present invention provides an error correcting system in which the memory capacity of the memory device is small, and the registers 14 and 17 in the above described conventional system are not required, by performing corrections according to the correcting operation which will be described in the following.

First, description will be given on the correcting operation method which is used in the system of the present invention. Returning to the calculating stage of the equations (6) and (10), the following relationship exists between the vector $W_j$ and the intermediate calculated vector $S_0 (=S'_1 \oplus T^{i-n-1} \cdot S'_2)$.

$$(I \oplus T^{-k}) \cdot W_j = S_0 \tag{16}$$

In the above equation (16), $-k=i-j$. Moreover, when $(I \oplus T^{-k})^{-1}$ is multiplied to the above equation (16), equation (10) can be obtained. The equation (10) can also be described in the following manner.

$$W_j = (I \oplus T^{-k})^{-1} \cdot S_0 \tag{17}$$

Next, the m by m matrix $(I \oplus T^{-k})^{-1}$ is considered in the following manner.

$$(I \oplus T^{-k})^{-1} = M_k = [M_{k1} M_{k2} \ldots M_{km}]^t \tag{18}$$

That is, the m by m matrix $M_k$ is separated into m row matrices $M_{k1}$ through $M_{km}$ respectively having m elements.

When $W_j=(a_1, a_2, \ldots, a_m)^t$, the l-th row matrix $M_{kl}$ can be described by equation (19), and the l-th element $a_l$ can be calculated.

$$M_{kl} \cdot S_0 = a_l \tag{19}$$

In a first embodiment of an error correcting system according to the present invention, the correcting operation is performed by selectively using one row matrix of $(n-1)$ kinds of row matrices $M_{1d}, M_{2d}, \text{---}, M_{n-1,d}$ according to the value of $i-j=-k$. These $(n-1)$ kinds of row matrices $M_{1d}, M_{2d}, \text{---}, M_{n-1,d}$ are row matrices $M_{kd}$ respectively having $e_1$ through $e_m$ as the elements of GF(2), wherein k is 1 to $(n-1)$ in the following equation (20) which describes the first order combination row matrices $M_{k1}$ through $M_{km}$.

$$M_{kd} = e_1 \cdot M_{k1} \oplus e_2 \cdot M_{k2} \oplus \ldots \oplus e_m \cdot M_{km} \tag{20}$$

In the above equation (20), at least one of the elements $e_1$ through $e_m$ is not "0".

Description will now be given on a matrix $M_{kl}$ which is selected arbitrarily. The correcting operation performed by use of the matrix $M_{kd}$ is a linear combination of each of the correcting operations performed by respective matrices $M_{kl}$, where $l=1, \text{---}, m$. Furthermore, since the matrix $M_k$ is a regular m by m matrix, and the row matrices $M_{k1}$ through $M_{km}$ respectively are first order independent, the arbitrarily formed matrix (excluding a zero matrix) having m elements, can be described by the first order combination of the matrices $M_{k1}$ through $M_{km}$, that is, by the above equation (20). Accordingly, one matrix among the $(n-1)$ matrices $M_{kd}$, can be any row matrix having m elements excluding a zero matrix. Moreover, in the above equation (20), the elements $e_1$ through $e_m$ are elements of GF(2), and are "0" or "1".

In the present invention, when m integers are designated by $L_1, L_2, \text{---}, L_m$, the correcting operation can be performed by using $T^{L_1}S_0, T^{L_2}S_0, \ldots, T^{L_m}S_0$ and $M_{kl}$. Accordingly, it will be first shown that this correcting operation can be performed by use of the above matrices, and then, description will be given with respect to the matrix $M_{kd}$.

When $T^L$ is multiplied to both sides of the equation (16), where L indicates an arbitrary integer, $$T^L \cdot (I \oplus T^{-k}) \cdot W_j = T^L \cdot S_0 \tag{21}$$

However, since $$\begin{aligned} T^L \cdot (I \oplus T^{-k}) &= T^L \oplus T^L \cdot T^{-k} \\ &= I \cdot T^L \oplus T^{L-k} \\ &= (I \oplus T^{-k}) \cdot T^L, \end{aligned}$$

equation (16) becomes as follows.

$$(I \oplus T^{-k}) \cdot T^L \cdot W_j = T^L \cdot S_0 \tag{22}$$

It is assumed that the l-th row matrix $_L T_l$ of $T^L$ is described by the following equation.

$$_L T_l = (_L t_{l1}, _L t_{l2}, \ldots, _L t_{lm})$$

The l-th element $_L T_l \cdot W_j$ of $T^L \cdot W_j$ can be calculated instead of the l-th element $a_l$ of $W_j$ which is indicated by the equation (19). That is when $W_j=(a_1, a_2, \ldots, a_m)^t$, and $T^L \cdot W_j=(_L a_1, _L a_2, \ldots, _L a_m)^t$, the following equation is obtained.

$$M_{kl}(T^L \cdot S_0) = _L a_l = _L T_l \cdot W_j = _L t_{l1} \cdot a_1 \oplus _L t_{l2} \cdot a_2 \oplus \ldots \oplus _L t_{lm} \cdot a_m \tag{23}$$

Accordingly, the vector $W'_j$ obtained by multiplying $T^{L_1} \cdot S_0, T^{L_2} \cdot S_0, \ldots$ by $M_{kl}$, can be described by the following.

$$\begin{aligned} W'_j &= (a'_1, a'_2, \ldots, a'_m) \\ a'_1 &= L_1 t_{l1} \cdot a_1 \oplus L_1 t_{l2} \cdot a_2 \oplus \ldots \oplus L_1 t_{lm} \cdot a_m \\ a'_m &= L_m t_{l1} \cdot a_1 \oplus L_m t_{l2} \cdot a_2 \oplus \ldots \oplus L_m t_{lm} \cdot a_m \end{aligned} \tag{24}$$

By transforming equation (24) into a matrix form, the following equations (25) and (26) can be obtained.

$$W'_j = {}_l T' \cdot W_j \tag{25}$$

$$_l T' = \begin{bmatrix} L_1 t_{l1} & L_1 t_{l2} & \ldots & L_1 t_{lm} \\ \cdot & & & \cdot \\ \cdot & & & \cdot \\ L_m t_{l1} & L_m t_{l2} & \ldots & L_m t_{lm} \end{bmatrix} \tag{26}$$

Therefore, the vector $W_j$ can be obtained by calculating the following equation (27).

$$W_j = {}_l T'^{-1} \cdot W'_j \tag{27}$$

In order that the matrix $_l T'^{-1}$ can be obtained, the matrix $_l T'$ must be regular, however, when $T^{L_1}, T^{L_2}, \ldots T^{L_m}$ are linearly independent, the matrix $_l T'$ becomes regular.

Next, it is assured that a vector obtained by using $M_{kd} = e_1 \cdot M_{k1} \oplus \ldots \oplus e_m \cdot M_{km}$, instead of the arbitrarily selected matrix $M_{kl}$, is designated by $W''_j$ and defined as $W''_j=(a''_1, a''_2, \ldots, a''_m)$. The following equation (28)

can be formed as a first order combination of the equation (23) when $l=1, \ldots, m$.

$$W''_j = e_1 \cdot {}_1T \cdot W_j \oplus e_2 \cdot {}_2T \cdot W_j \oplus \ldots \oplus e_m \cdot {}_mT \cdot W_j \\ = {}_0T \cdot W_j \tag{28}$$

Thus the information vector $W_j$ can be obtained from ${}_0T'^{-1}W''_j$. The regularity of ${}_0T'$ is similar to that for the above described $_iT'$. Furthermore, $_iT'^{-1}$ or ${}_0T^{-1}$ is a matrix which is independent of $k$. Accordingly, the control circuits which were necessary in conventional system become unnecessary, and the system of the invention can be constructed relatively simply by use of only the exclusive-OR circuits. Hence, the circuit construction can be simplified by selecting the matrix $M_{kd}$ (a simple construction as a whole can be selected by use of $(n-1)$ matrices $M_{kd}$ and ${}_0T'^{-1}$).

Figure 2:
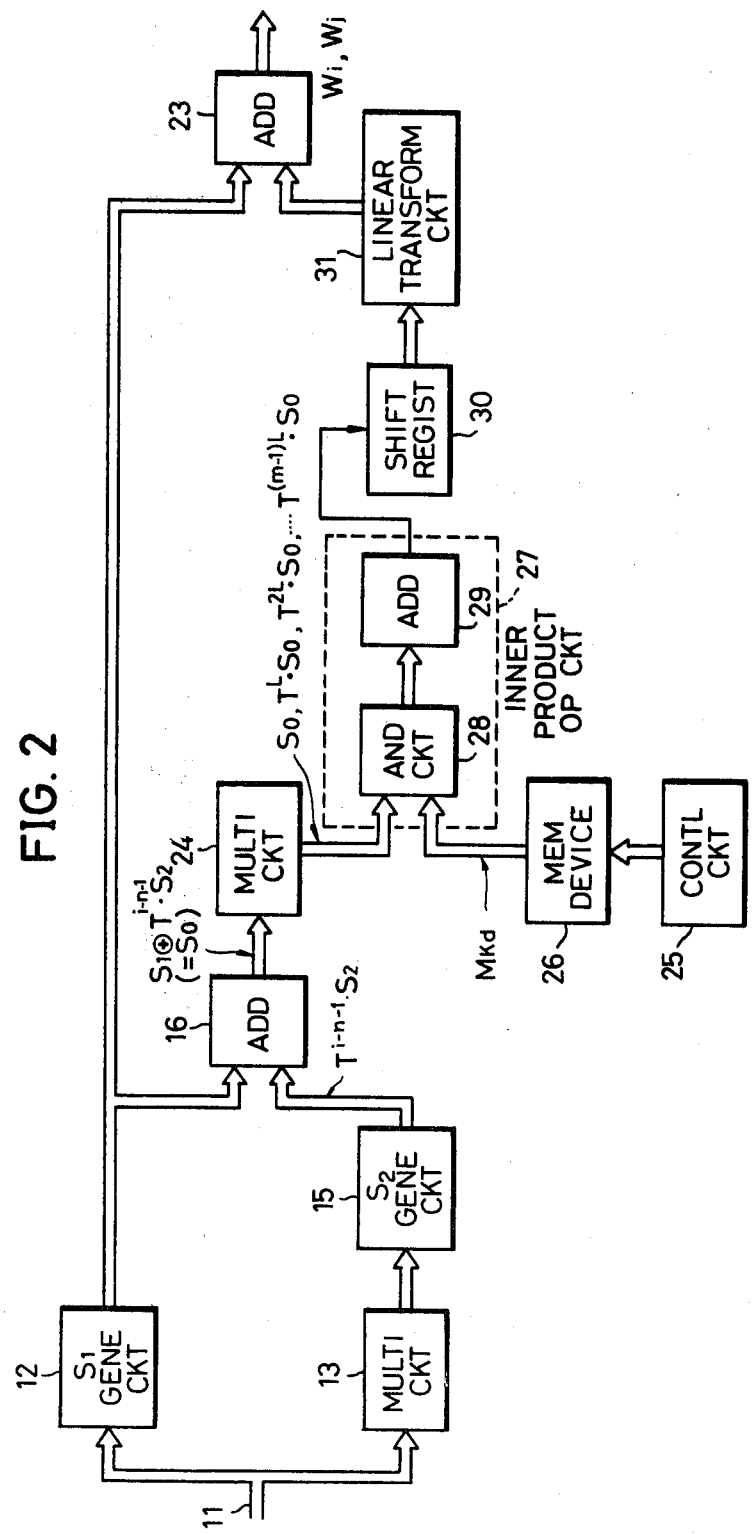
FIG. 2 is a systematic block diagram showing a first embodiment of a double error correcting system according to the present invention.
Figure 3:
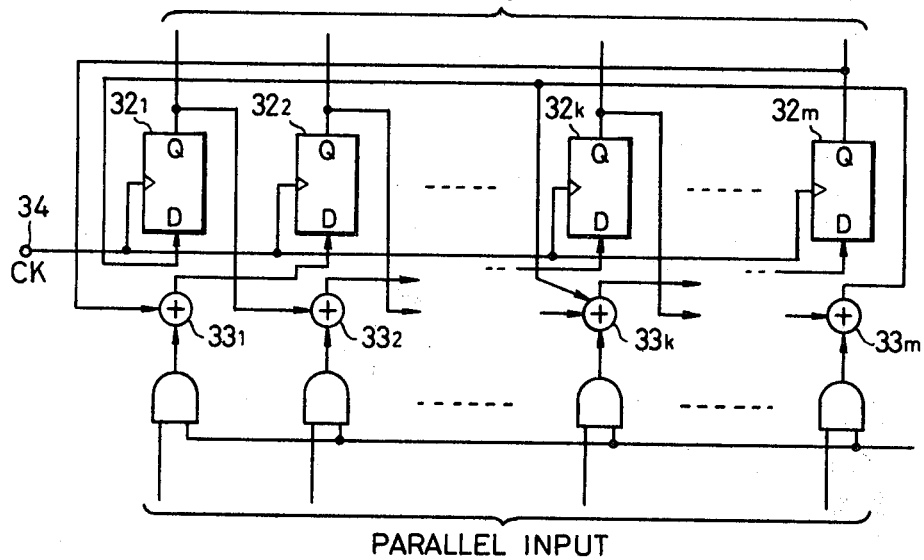
FIG. 3 is a circuit diagram showing an embodiment of an essential part of the block system shown in FIG. 2.

FIG. 2 shows a block system of a first embodiment of an error correcting system according to the present invention, which uses the above described error correcting method. In FIG. 2, those parts which are the same as those corresponding parts in FIG. 1 are designated by the like reference numerals, and their description will be omitted. The output column vector $S_0$ obtained from the adder 16, is supplied to a multiplying circuit 24 wherein the output column vector $S_0$ is multiplied by $T^L$. Accordingly, the output described by $$S_0, T^L \cdot S_0, T^{2L} \cdot S_0, T^{3L} \cdot S_0, \ldots, T^{(m-1)L} \cdot S_0$$

or $T^L \cdot S_0, T^{2L} \cdot S_0, \ldots, T^{mL} \cdot S_0$ is supplied to an AND circuit 28. The above multiplier 24 is generally constructed as shown in FIG. 3, wherein $m$ registers $32_1$ through $32_m$ which is equal to the number of elements in the information vector, and a plurality of exclusive-OR circuits $33_1$ through $33_m$ are provided. The multiplying circuit 24 multiplies $T^L$ to the vectors which are stored within the registers $32_1$ through $32_m$, every time one clock pulse is applied to an input terminal 34.

On the other hand, a memory device 26 shown in FIG. 2 is a memory device comprising ROM devices or decoders, which selectively produces first order combination row matrices $M_{kd}$ of a row matrix formed from the m-th row of an m by m matrix $(I \oplus T^{i-j})^{-1}$, according to the value of $i-j$ $(=-k)$. As described above, arbitrary first order combination row matrices $M_{kd}$ excluding a zero matrix, of the matrices $M_{k1}$ through $M_{km}$ in the equation (18), that is, $$M_{1d} = e_1 \cdot M_{11} \oplus e_2 \cdot M_{12} \oplus \ldots \oplus e_m \cdot M_{1m}$$
$$M_{22} = e_1 \cdot M_{21} \oplus e_2 \cdot M_{22} \oplus \ldots \oplus e_m \cdot M_{2m}$$
$$\vdots$$
$$M_{(n-1)d} = e_1 \cdot M_{(n-1)1} \oplus e_2 \cdot M_{(n-1)2} \oplus \ldots \oplus e_m \cdot M_{(n-1)m}$$

are stored in the memory device 26. A row matrix $M_{kd}$ is selected under the control of a control circuit 25 according to the value of $i-j=-k$. This matrix $M_{kd}$ thus selected is supplied to an inner product operating circuit 27 comprising the AND circuit 28 and an adder 29, wherein the inner product between the matrix $M_{kd}$ and the parallel outputs $S_0, T^L \cdot S_0, T^{2L} \cdot S_0, \ldots, T^{(m-1)L} \cdot S_0$ of the multiplying circuit 24 are calculated.

Figure 4:
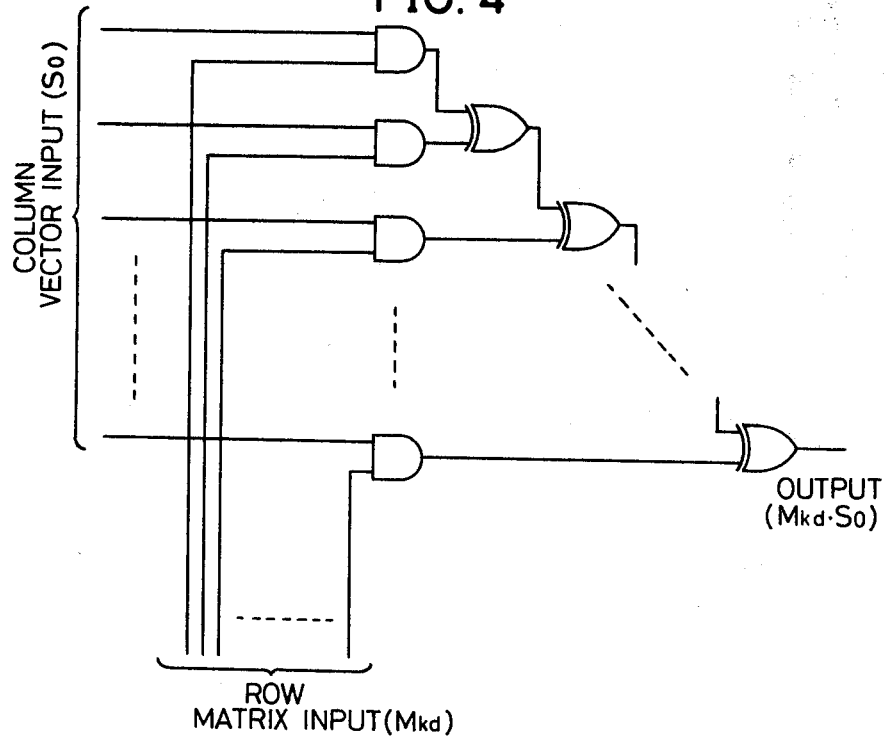
FIG. 4 is a circuit diagram showing an embodiment of another essential part of the block system shown in FIG. 2.

The inner product operating circuit 27 comprises a group of AND gates and a group of exclusive-OR circuits as shown in FIG. 4. Each element of the linearly transformed vector $W''_j$ of the information vector $W_j$, is successively and serially supplied to a shift register 30, and these elements are stored in the shift register 30 in synchronism with the clock pulses supplied from the terminal 34.

The reason for correcting two erroneous words in a serial manner instead of performing the correction in a parallel manner in adjacent code correction, will now be described. The vector $W_j$ can be calculated in a parallel manner from the equation $M_k \cdot S_0 = W_j$, when there is a number of exclusive-OR circuits, where the number of the exclusive-OR circuits equals the number obtained when $m$ is subtracted from the number of elements of the matrix $M_k$ having $m^2$ elements, which are not "0", that is, which are "1". However, since there is a plurality of the matrices $M_k$, the contents of the matrices $M_k$ must be changed over in order to perform operations on all the matrices $M_k$. Accordingly, in order to perform the above operations, the operational circuit must have $m(m-1)$ exclusive-OR circuits, $m^2$ AND circuits, and $m^2$ $m^2$-bit memory devices for controlling the $m^2$ AND circuits. Moreover, the scale of the above operational circuit becomes large, since $m^2$ bits must be produced in a parallel manner. In addition, when the value of $m^2$ becomes larger than nine, there are no ROM devices at the present which can produce $m^2$ bits, that is, eighty-one bits, in a parallel manner. Therefore, in order to realize the above memory device which can produce $m^2$ bits in a parallel manner, a ROM device having $m^2 \times (n-1)$ bits and a register which can produce $m^2$ bits in a parallel manner, are used simultaneously, and control circuits for controlling these devices accordingly become necessary. When the value of $m$ is fourteen, for example, in addition to the ROM device which is originally required, a register for accommodating $m^2$ bits, that is, 196 bits, a control circuit for controlling this register, 182 exclusive-OR circuits, and 196 AND circuits become necessary, and this of course is not practical. Accordingly, in general, the double error correcting operation using error pointers of adjacent codes, is performed in a serial manner instead of performing the operation in a parallel manner.

$W'_j$ or $W''_j$ is a linear transformation of the information vector $W_j$ which is obtained through a serial-to-parallel conversion performed at the shift register 30. This $W'_j$ or $W''_j$ is supplied to a linear transformation circuit 31 which multiplies $_iT'^{-1}$ or ${}_0T'^{-1}$ with the input thus supplied. Thus an m by m linear transformation is performed at this linear transformation circuit 31, to respectively correct and restore each element of the information vector $W_j$, and these corrected and restored elements are produced as output in a parallel manner.

Figure 14:
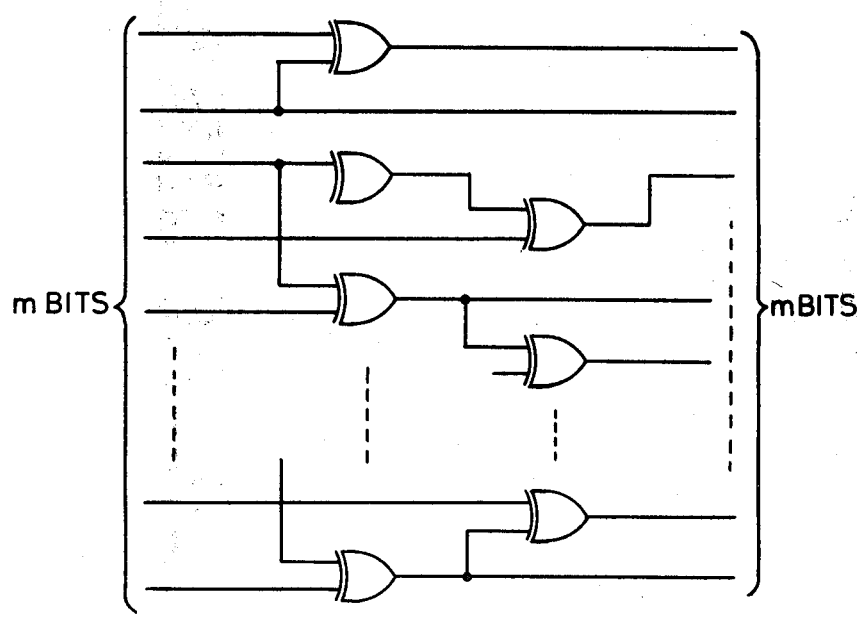
FIG. 14 is a circuit diagram showing an embodiment of another essential part of the system according to the present invention.

The above described linear transformation circuit 31 is of a simple construction, comprising exclusive-OR circuits as shown in FIG. 14. That is, since the parallel output $W''_j$ of the shift register 30 is $(a''_1, a''_2, \ldots, a''_m)$, in a case where a predetermined information vector $W_j = (a_1, a_2, \ldots, a''_m)^t$ is to be obtained, the following equations can be formed when the matrix ${}_0T'^{-1} = [Z_1, Z_2, \ldots, Z_m]^t$ and $Z_1$ through $Z_m$ are assumed to be row matrices.

$$\begin{cases} a_1 = Z_1 \cdot W''_j = z_{11}a''_1 \oplus z_{12}a''_2 \oplus \ldots \oplus z_{1m}a''_m \\ a_2 = Z_2 \cdot W''_j = z_{21}a''_1 \oplus z_{22}a''_2 \oplus \ldots \oplus z_{2m}a''_m \\ \vdots \\ a_m = Z_m \cdot W''_j = z_{m1}a''_1 \oplus z_{m2}a''_2 \oplus \ldots \oplus z_{mm}a''_m \end{cases}$$

The linear transformation circuit 31 performs the above matrix operations. When K (K is an integer) elements of the m elements of the row matrix $Z_l$, which are not "0", that is, which are "1", exist, only the term $z_{li}=1$ (i=1, ---, m) of the equation $$a_l = z_{l1} \cdot a''_1 \oplus z_{l2} \cdot a''_2 \oplus \ldots \oplus z_{lm} \cdot a''_m$$

need to be calculated, in order to obtain $a_l = Z_l \cdot W''_j$. Therefore, when the i which satisfy equation $z_{li}=1$ are designated by $i_1, i_2, ---, i_K$, the equation $a_l = Z_l \cdot W''_j$ can be obtained by calculating the following equation.

$$a_l = a''_{li_1} \oplus a''_{li_2} \oplus a''_{li_3} \oplus \ldots \oplus a''_{li_K}$$

Thus, $a_l$ can be calculated by using (K−1) exclusive-OR circuits. Similarly, $a_1$ through $a_m$ can also be obtained by use of a number of exclusive-OR circuits, where the number of exclusive-OR circuits equals a number obtained by subtracting one from the number of elements in ach of $Z_1$ through $Z_m$ which are "1". Since $_0T'^{-1}$ is regular, each of $Z_1$ through $Z_m$ has at least one element which is "1". When the number of m by m elements of Z which are "1" is designated by $K_M$, the number of exclusive-OR circuit required to perform the above described matrix operation becomes $(K_M - m)$.

Figure 5:
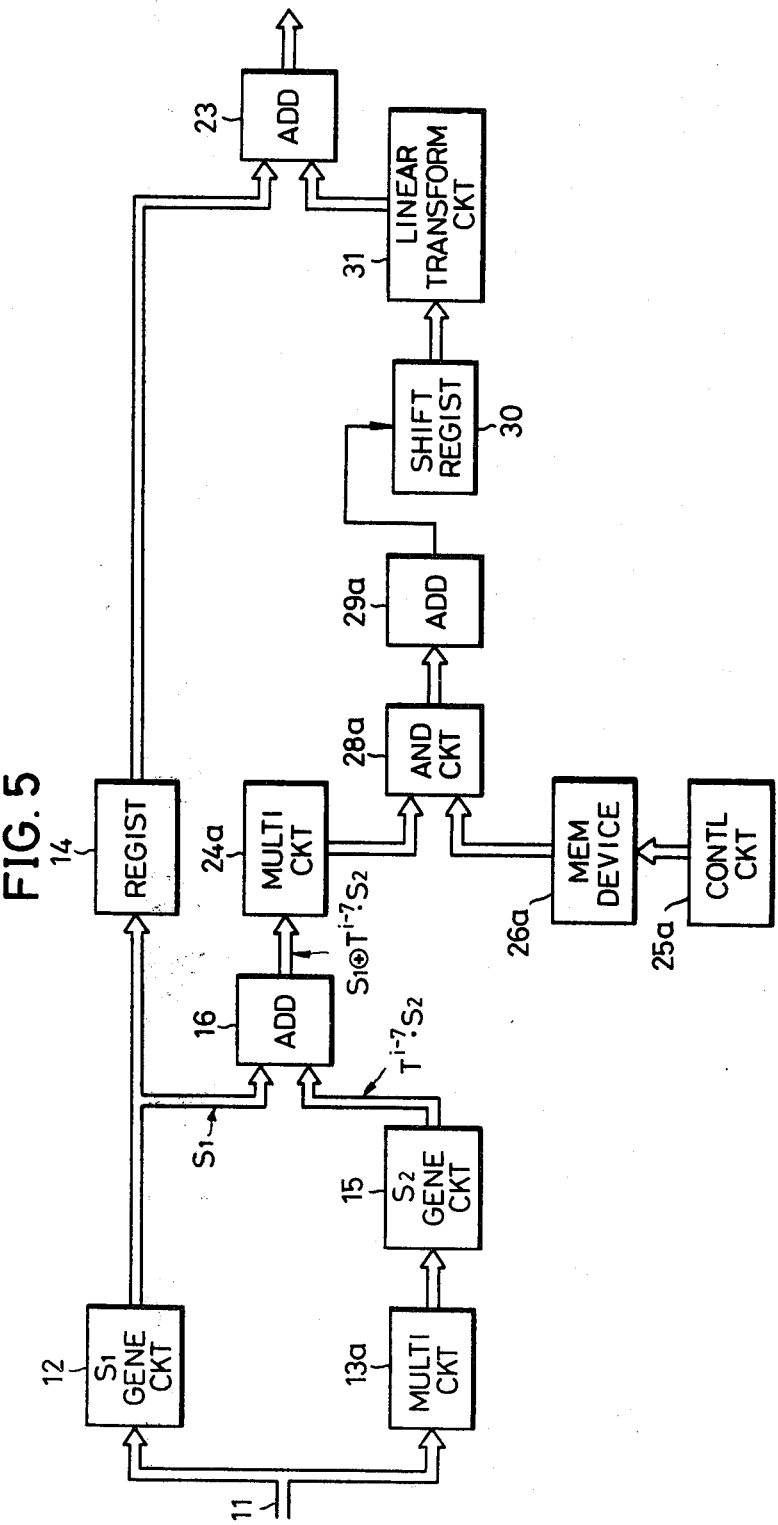
FIG. 5 is a systematic block diagram showing a second embodiment of a double error correcting system according to the present invention.

A block system of a second embodiment of an error correcting system according to the present invention is shown in FIG. 5. In FIG. 5, those parts which are the same as those corresponding parts in FIG. 2 are designated by the like reference numerals, and their description will be omitted. The present embodiment of the invention shows a case where m=14 and n=6. Accordingly, the linear transformation matrix T can be shown as follows, since the matrix T is a companion matrix of the polynomial $x^{14}+x^8+1$.

$$T = \begin{pmatrix} 0 & 0 & 0 & 0 & 0 & 0 & 0 & 0 & 0 & 0 & 0 & 0 & 0 & 1 \\ 1 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 \\ 0 & 0 & 0 & 0 & 0 & 0 & 0 & 1 & 0 & 0 & 0 & 0 & 0 & 1 \\ 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 1 & 0 \end{pmatrix}$$

Therefore, the 5 (=n−1) kinds of inverse matrices become as shown in the following.

$$(I \oplus T^{-1})^{-1} = M_1 = \begin{pmatrix} 1 & 1 & 1 & 1 & 1 & 1 & 1 & 1 & 1 & 1 & 1 & 1 & 1 & 1 \\ 0 & 1 & 1 & 1 & 1 & 1 & 1 & 1 & 1 & 1 & 1 & 1 & 1 & 1 \\ 0 & 0 & 1 & 1 & 1 & 1 & 1 & 1 & 1 & 1 & 1 & 1 & 1 & 1 \\ 0 & 0 & 0 & 1 & 1 & 1 & 1 & 1 & 1 & 1 & 1 & 1 & 1 & 1 \\ 0 & 0 & 0 & 0 & 1 & 1 & 1 & 1 & 1 & 1 & 1 & 1 & 1 & 1 \\ 0 & 0 & 0 & 0 & 0 & 1 & 1 & 1 & 1 & 1 & 1 & 1 & 1 & 1 \\ 0 & 0 & 0 & 0 & 0 & 0 & 1 & 1 & 1 & 1 & 1 & 1 & 1 & 1 \\ 0 & 0 & 0 & 0 & 0 & 0 & 0 & 1 & 1 & 1 & 1 & 1 & 1 & 1 \\ 1 & 1 & 1 & 1 & 1 & 1 & 1 & 1 & 0 & 0 & 0 & 0 & 0 & 0 \\ 1 & 1 & 1 & 1 & 1 & 1 & 1 & 1 & 1 & 0 & 0 & 0 & 0 & 0 \\ 1 & 1 & 1 & 1 & 1 & 1 & 1 & 1 & 1 & 1 & 0 & 0 & 0 & 0 \\ 1 & 1 & 1 & 1 & 1 & 1 & 1 & 1 & 1 & 1 & 1 & 0 & 0 & 0 \\ 1 & 1 & 1 & 1 & 1 & 1 & 1 & 1 & 1 & 1 & 1 & 1 & 0 & 0 \\ 1 & 1 & 1 & 1 & 1 & 1 & 1 & 1 & 1 & 1 & 1 & 1 & 1 & 0 \end{pmatrix}$$

$$(I \oplus T^{-2})^{-1} = M_2 = \begin{pmatrix} 1 & 0 & 1 & 0 & 1 & 0 & 1 & 0 & 1 & 0 & 1 & 0 & 1 & 0 \\ 0 & 1 & 0 & 1 & 0 & 1 & 0 & 1 & 0 & 1 & 0 & 1 & 0 & 1 \\ 0 & 0 & 1 & 0 & 1 & 0 & 1 & 0 & 1 & 0 & 1 & 0 & 1 & 0 \\ 0 & 0 & 0 & 1 & 0 & 1 & 0 & 1 & 0 & 1 & 0 & 1 & 0 & 1 \\ 0 & 0 & 0 & 0 & 1 & 0 & 1 & 0 & 1 & 0 & 1 & 0 & 1 & 0 \\ 0 & 0 & 0 & 0 & 0 & 1 & 0 & 1 & 0 & 1 & 0 & 1 & 0 & 1 \\ 0 & 0 & 0 & 0 & 0 & 0 & 1 & 0 & 1 & 0 & 1 & 0 & 1 & 0 \\ 0 & 0 & 0 & 0 & 0 & 0 & 0 & 1 & 0 & 1 & 0 & 1 & 0 & 1 \\ 1 & 0 & 1 & 0 & 1 & 0 & 1 & 0 & 0 & 0 & 0 & 0 & 0 & 0 \\ 0 & 1 & 0 & 1 & 0 & 1 & 0 & 1 & 0 & 0 & 0 & 0 & 0 & 0 \\ 1 & 0 & 1 & 0 & 1 & 0 & 1 & 0 & 1 & 0 & 0 & 0 & 0 & 0 \\ 0 & 1 & 0 & 1 & 0 & 1 & 0 & 1 & 0 & 1 & 0 & 0 & 0 & 0 \\ 1 & 0 & 1 & 0 & 1 & 0 & 1 & 0 & 1 & 0 & 1 & 0 & 0 & 0 \\ 0 & 1 & 0 & 1 & 0 & 1 & 0 & 1 & 0 & 1 & 0 & 1 & 0 & 0 \end{pmatrix}$$

$$(I \oplus T^{-3})^{-1} = M_3 = \begin{pmatrix} 1 & 0 & 0 & 1 & 0 & 0 & 1 & 0 & 0 & 1 & 0 & 0 & 1 & 0 \\ 0 & 1 & 0 & 0 & 1 & 0 & 0 & 1 & 0 & 0 & 1 & 0 & 0 & 1 \\ 0 & 0 & 1 & 0 & 0 & 1 & 0 & 0 & 1 & 0 & 0 & 1 & 0 & 0 \\ 0 & 0 & 0 & 1 & 0 & 0 & 1 & 0 & 0 & 1 & 0 & 0 & 1 & 0 \\ 0 & 0 & 0 & 0 & 1 & 0 & 0 & 1 & 0 & 0 & 1 & 0 & 0 & 1 \\ 0 & 0 & 0 & 0 & 0 & 1 & 0 & 0 & 1 & 0 & 0 & 1 & 0 & 0 \\ 0 & 0 & 0 & 0 & 0 & 0 & 1 & 0 & 0 & 1 & 0 & 0 & 1 & 0 \\ 0 & 0 & 0 & 0 & 0 & 0 & 0 & 1 & 0 & 0 & 1 & 0 & 0 & 1 \\ 1 & 0 & 0 & 1 & 0 & 0 & 1 & 0 & 1 & 1 & 0 & 1 & 1 & 0 \\ 0 & 1 & 0 & 0 & 1 & 0 & 0 & 1 & 0 & 1 & 1 & 0 & 1 & 1 \\ 0 & 0 & 1 & 0 & 0 & 1 & 0 & 0 & 1 & 0 & 1 & 1 & 0 & 1 \\ 1 & 0 & 0 & 1 & 0 & 0 & 1 & 0 & 0 & 1 & 1 & 0 & 1 & 0 \\ 0 & 1 & 0 & 0 & 1 & 0 & 0 & 1 & 0 & 0 & 1 & 0 & 1 & 1 \\ 0 & 0 & 1 & 0 & 0 & 1 & 0 & 0 & 1 & 0 & 0 & 1 & 0 & 1 \end{pmatrix}$$

$$(I \oplus T^{-4})^{-1} = M_4 = \begin{pmatrix} 0 & 0 & 1 & 0 & 0 & 0 & 1 & 0 & 0 & 0 & 1 & 0 & 0 & 0 \\ 0 & 0 & 0 & 1 & 0 & 0 & 0 & 1 & 0 & 0 & 0 & 1 & 0 & 0 \\ 1 & 0 & 0 & 0 & 1 & 0 & 0 & 0 & 1 & 0 & 0 & 0 & 1 & 0 \\ 0 & 1 & 0 & 0 & 0 & 1 & 0 & 0 & 0 & 1 & 0 & 0 & 0 & 1 \\ 1 & 0 & 1 & 0 & 0 & 0 & 1 & 0 & 0 & 0 & 1 & 0 & 0 & 0 \\ 0 & 1 & 0 & 1 & 0 & 0 & 0 & 1 & 0 & 0 & 0 & 1 & 0 & 0 \\ 1 & 0 & 1 & 0 & 1 & 0 & 0 & 0 & 1 & 0 & 0 & 0 & 1 & 0 \\ 0 & 1 & 0 & 1 & 0 & 1 & 0 & 0 & 0 & 1 & 0 & 0 & 0 & 1 \\ 1 & 0 & 0 & 0 & 1 & 0 & 0 & 0 & 0 & 0 & 0 & 0 & 0 & 0 \\ 0 & 1 & 0 & 0 & 0 & 1 & 0 & 0 & 0 & 0 & 0 & 0 & 0 & 0 \\ 0 & 0 & 1 & 0 & 0 & 0 & 1 & 0 & 0 & 0 & 0 & 0 & 0 & 0 \\ 0 & 0 & 0 & 1 & 0 & 0 & 0 & 1 & 0 & 0 & 0 & 0 & 0 & 0 \\ 1 & 0 & 0 & 0 & 1 & 0 & 0 & 0 & 1 & 0 & 0 & 0 & 0 & 0 \\ 0 & 1 & 0 & 0 & 0 & 1 & 0 & 0 & 0 & 1 & 0 & 0 & 0 & 0 \end{pmatrix}$$

$$(I \oplus T^{-5})^{-1} = M_5 = \begin{pmatrix} 0 & 1 & 1 & 0 & 1 & 0 & 1 & 1 & 0 & 1 & 0 & 1 & 1 & 0 \\ 1 & 0 & 1 & 1 & 0 & 1 & 0 & 1 & 1 & 0 & 1 & 0 & 1 & 1 \\ 0 & 1 & 0 & 1 & 1 & 0 & 1 & 0 & 1 & 1 & 0 & 1 & 0 & 1 \\ 1 & 0 & 1 & 0 & 1 & 1 & 0 & 1 & 0 & 1 & 1 & 0 & 1 & 0 \\ 1 & 1 & 0 & 1 & 0 & 1 & 1 & 0 & 1 & 0 & 1 & 1 & 0 & 1 \\ 1 & 1 & 1 & 0 & 1 & 0 & 1 & 1 & 0 & 1 & 1 & 0 & 1 & 1 \\ 1 & 1 & 1 & 1 & 0 & 1 & 0 & 1 & 1 & 0 & 1 & 0 & 1 & 1 \\ 0 & 1 & 1 & 1 & 1 & 0 & 1 & 0 & 1 & 1 & 0 & 1 & 0 & 1 \\ 1 & 1 & 0 & 1 & 0 & 1 & 1 & 0 & 0 & 1 & 1 & 0 & 0 & 0 \\ 0 & 1 & 1 & 0 & 1 & 0 & 1 & 1 & 0 & 0 & 1 & 1 & 0 & 0 \\ 1 & 0 & 1 & 1 & 0 & 1 & 0 & 1 & 1 & 0 & 0 & 1 & 1 & 0 \\ 0 & 1 & 1 & 0 & 1 & 0 & 1 & 1 & 0 & 1 & 1 & 0 & 0 & 1 \\ 1 & 0 & 1 & 0 & 1 & 1 & 0 & 1 & 0 & 1 & 1 & 0 & 0 & 0 \\ 1 & 1 & 0 & 1 & 0 & 1 & 1 & 0 & 1 & 0 & 1 & 1 & 0 & 0 \end{pmatrix}$$

Figure 6:
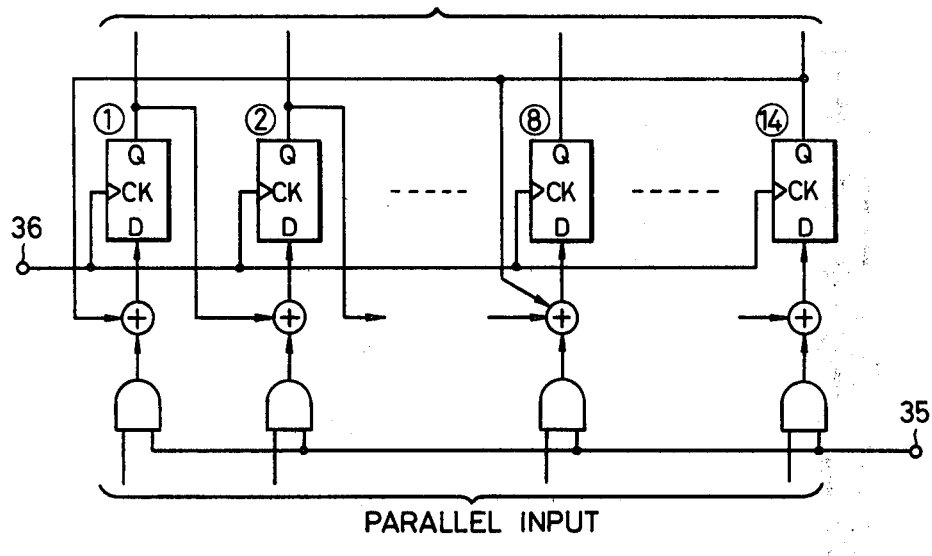
FIG. 6 is a circuit diagram showing an embodiment of an essential part of the block system shown in FIG. 5.

A multiplying circuit 13a is a circuit for multiplying $T^{-7}$, and comprises seven exclusive-OR circuits. $T^{i-7} \cdot S'_2$ which is produced by the generating circuit 15, is added with the output $S'_1$ of the generating circuit 12 at the adder 16. Accordingly, $S_0 = S'_1 \oplus T^{i-7} \cdot S'_2$ is obtained, and then applied to a multiplying circuit 24a. This multiplying circuit 24a is constructed as shown in FIG. 6. First, each register ① through ⑭ (14-bit) shown in FIG. 6 is in a cleared state, and when $S_0$ is obtained as input through the group of AND gates by closing a terminal 35, and one clock pulse CK is applied to a terminal 36, $S_0$ is accordingly stored within the registers of the multiplying circuit 24a.

Next, when the terminal 35 is opened to interrupt $S_0$ from being supplied, and when the clock pulse CK is successively applied to the terminal 36, the matrix T is successively and repetitively multiplied. Accordingly, $S_0$, $T \cdot S_0$, $T^2 \cdot S_0$, - - - , $T^{13} \cdot S_0$ are successively obtained in a parallel manner from the output terminal according to the number of clock pulses CK.

On the other hand, $W_j$, $T \cdot W_j$, - - - , $T^{13} \cdot W_j$ become as follows.

$$W_j = \begin{pmatrix} a_1 \\ a_2 \\ a_3 \\ a_4 \\ a_5 \\ a_6 \\ a_7 \\ a_8 \\ a_9 \\ a_{10} \\ a_{11} \\ a_{12} \\ a_{13} \\ a_{14} \end{pmatrix} \quad T \cdot W_j = \begin{pmatrix} a_{14} \\ a_1 \\ a_2 \\ a_3 \\ a_4 \\ a_5 \\ a_6 \\ a_7 \\ a_8 \oplus a_{14} \\ a_9 \\ a_{10} \\ a_{11} \\ a_{12} \\ a_{13} \end{pmatrix} \quad T^2 \cdot W_j = \begin{pmatrix} a_{13} \\ a_{14} \\ a_1 \\ a_2 \\ a_3 \\ a_4 \\ a_5 \\ a_6 \\ a_7 \oplus a_{13} \\ a_8 \oplus a_{14} \\ a_9 \\ a_{10} \\ a_{11} \\ a_{12} \end{pmatrix}$$

$$T^3 \cdot W_j = \begin{pmatrix} a_{12} \\ a_{13} \\ a_{14} \\ a_1 \\ a_2 \\ a_3 \\ a_4 \\ a_5 \\ a_6 \oplus a_{12} \\ a_7 \oplus a_{13} \\ a_8 \oplus a_{14} \\ a_9 \\ a_{10} \\ a_{11} \end{pmatrix} \quad T^4 \cdot W_j = \begin{pmatrix} a_{11} \\ a_{12} \\ a_{13} \\ a_{14} \\ a_1 \\ a_2 \\ a_3 \\ a_4 \\ a_5 \oplus a_{11} \\ a_6 \oplus a_{12} \\ a_7 \oplus a_{13} \\ a_8 \oplus a_{14} \\ a_9 \\ a_{10} \end{pmatrix}$$

$$T^5 \cdot W_j = \begin{pmatrix} a_{10} \\ a_{11} \\ a_{12} \\ a_{13} \\ a_{14} \\ a_1 \\ a_2 \\ a_3 \\ a_4 \oplus a_{10} \\ a_5 \oplus a_{11} \\ a_6 \oplus a_{12} \\ a_7 \oplus a_{13} \\ a_8 + a_{14} \\ a_9 \end{pmatrix} \quad T^6 \cdot W_j = \begin{pmatrix} a_9 \\ a_{10} \\ a_{11} \\ a_{12} \\ a_{13} \\ a_{14} \\ a_1 \\ a_2 \\ a_3 \oplus a_9 \\ a_4 \oplus a_{10} \\ a_5 \oplus a_{11} \\ a_6 \oplus a_{12} \\ a_7 \oplus a_{13} \\ a_8 \oplus a_{14} \end{pmatrix}$$

$$T^7 \cdot W_j = \begin{pmatrix} a_8 \oplus a_{14} \\ a_9 \\ a_{10} \\ a_{11} \\ a_{12} \\ a_{13} \\ a_{14} \\ a_1 \\ a_2 \oplus a_8 \oplus a_{14} \\ a_3 \oplus a_9 \\ a_4 \oplus a_{10} \\ a_5 \oplus a_{11} \\ a_6 \oplus a_{12} \\ a_7 \oplus a_{13} \end{pmatrix} \quad T^8 \cdot W_j = \begin{pmatrix} a_7 \oplus a_{13} \\ a_8 \oplus a_{14} \\ a_9 \\ a_{10} \\ a_{11} \\ a_{12} \\ a_{13} \\ a_{14} \\ a_1 \oplus a_7 \oplus a_{13} \\ a_2 \oplus a_8 \oplus a_{14} \\ a_3 \oplus a_9 \\ a_4 \oplus a_{10} \\ a_5 \oplus a_{11} \\ a_6 \oplus a_{12} \end{pmatrix}$$

$$T^9 \cdot W_j = \begin{pmatrix} a_6 \oplus a_{12} \\ a_7 \oplus a_{13} \\ a_8 \oplus a_{14} \\ a_9 \\ a_{10} \\ a_{11} \\ a_{12} \\ a_{13} \\ a_{14} \oplus a_6 \oplus a_{12} \\ a_1 \oplus a_7 \oplus a_{13} \\ a_2 \oplus a_8 \oplus a_{14} \\ a_3 \oplus a_9 \\ a_4 \oplus a_{10} \\ a_5 \oplus a_{11} \end{pmatrix} \quad T^{10} \cdot W_j = \begin{pmatrix} a_5 \oplus a_{11} \\ a_6 \oplus a_{12} \\ a_7 \oplus a_{13} \\ a_8 \oplus a_{14} \\ a_9 \\ a_{10} \\ a_{11} \\ a_{12} \\ a_{13} \oplus a_5 \oplus a_{11} \\ a_{14} \oplus a_6 \oplus a_{12} \\ a_1 \oplus a_7 \oplus a_{13} \\ a_2 \oplus a_8 \oplus a_{14} \\ a_3 \oplus a_9 \\ a_4 \oplus a_{10} \end{pmatrix}$$

$$T^{11} \cdot W_j = \begin{pmatrix} a_4 \oplus a_{10} \\ a_5 \oplus a_{11} \\ a_6 \oplus a_{12} \\ a_7 \oplus a_{13} \\ a_8 \oplus a_{14} \\ a_9 \\ a_{10} \\ a_{11} \\ a_{12} \oplus a_4 \oplus a_{10} \\ a_{13} \oplus a_5 \oplus a_{11} \\ a_{14} \oplus a_6 \oplus a_{12} \\ a_1 \oplus a_7 \oplus a_{13} \\ a_2 \oplus a_8 \oplus a_{14} \\ a_3 \oplus a_9 \end{pmatrix} \quad T^{12} \cdot W_j = \begin{pmatrix} a_3 \oplus a_9 \\ a_4 \oplus a_{10} \\ a_5 \oplus a_{11} \\ a_6 \oplus a_{12} \\ a_7 \oplus a_{13} \\ a_8 \oplus a_{14} \\ a_9 \\ a_{10} \\ a_{11} \oplus a_3 \oplus a_9 \\ a_{12} \oplus a_4 \oplus a_{10} \\ a_{13} \oplus a_5 \oplus a_{11} \\ a_{14} \oplus a_6 \oplus a_{12} \\ a_1 \oplus a_7 \oplus a_{13} \\ a_2 \oplus a_8 \oplus a_{14} \end{pmatrix}$$

$$T^{13} \cdot W_j = \begin{pmatrix} a_2 \oplus a_8 \oplus a_{14} \\ a_3 \oplus a_9 \\ a_4 \oplus a_{10} \\ a_5 \oplus a_{11} \\ a_6 \oplus a_{12} \\ a_7 \oplus a_{13} \\ a_8 \oplus a_{14} \\ a_9 \\ a_{10} \oplus a_2 \oplus a_8 \oplus a_{14} \\ a_{11} \oplus a_3 \oplus a_9 \\ a_{12} \oplus a_4 \oplus a_{10} \\ a_{13} \oplus a_5 \oplus a_{11} \\ a_{14} \oplus a_6 \oplus a_{12} \\ a_1 \oplus a_7 \oplus a_{13} \end{pmatrix}$$

Thus, when $M_{k1}$ is selected as $M_{kd}$, that is, when the first rows which are $M_{11}$, $M_{21}$, $M_{31}$, $M_{41}$, and $M_{51}$, of $M_1$ through $M_5$ are used, these first rows can be described by the following.

$M_{11} = 1\ 1\ 1\ 1\ 1\ 1\ 1\ 1\ 1\ 1\ 1\ 1\ 1\ 1$
$M_{21} = 1\ 0\ 1\ 0\ 1\ 0\ 1\ 0\ 1\ 0\ 1\ 0\ 1\ 0$
$M_{31} = 1\ 0\ 0\ 1\ 0\ 0\ 1\ 0\ 0\ 1\ 0\ 0\ 1\ 0$
$M_{41} = 0\ 0\ 1\ 0\ 0\ 0\ 1\ 0\ 0\ 0\ 1\ 0\ 0\ 0$
$M_{51} = 0\ 1\ 1\ 0\ 1\ 0\ 1\ 1\ 1\ 0\ 1\ 0\ 1\ 1\ 0$

These row matrices $M_{11}$ through $M_{51}$ are selected and produced from a memory device 26a shown in FIG. 5 according to the value of k. The inner product between $S_0$ through $T^{13} \cdot S_0$ which are successively produced from the multiplying circuit 24a and the above row matrices $M_{11}$ through $M_{51}$ are calculated by on AND circuit 28a and an adder 29a. Hence, the linear transformation vector $W''_j$ thus obtained, is a vector which has the first rows of $W_j$ through $T^{13} \cdot W_j$, and the relationship between $W''_j$ and $_1T'$ can be described by the following equation.

$$W''_j = {}_1T \cdot W_j$$

where $$_1T = \begin{pmatrix} 1000000000000 \\ 0000000000001 \\ 0000000000010 \\ 0000000000100 \\ 0000000001000 \\ 0000000010000 \\ 0000000100000 \\ 0000001000001 \\ 0000010000010 \\ 0000100000100 \\ 0001000001000 \\ 0010000010000 \\ 0100000100000 \\ 0100000100000 \\ 0100000100001 \end{pmatrix} \quad W''_j = \begin{pmatrix} a_1 \\ a_{14} \\ a_{13} \\ a_{12} \\ a_{11} \\ a_{10} \\ a_9 \\ a_8 \oplus a_{14} \\ a_7 \oplus a_{13} \\ a_6 \oplus a_{12} \\ a_5 \oplus a_{11} \\ a_4 \oplus a_{10} \\ a_3 \oplus a_9 \\ a_2 \oplus a_8 \oplus a_{14} \end{pmatrix}$$

Accordingly, the operation $_1T'^{-1}$ of the linear transformation circuit 31, for obtaining the linear transformation vector $W'''_j$ and the information vector $W_j$, becomes as follows.

$$_1T^{-1} = \begin{pmatrix} 1000000000000 \\ 0000000100000 1 \\ 0000001000010 \\ 0000010000100 \\ 0000100001000 \\ 0001000010000 \\ 0010000100000 \\ 0100000100000 \\ 0000001000000 \\ 0000010000000 \\ 0000100000000 \\ 0001000000000 \\ 0010000000000 \\ 0100000000000 \end{pmatrix}$$

The operation of this matrix $_1T^{-1}$ can be performed by use of seven exclusive-OR circuits.

Moreover, when $M_{k8}$ is selected as $M_{kd}$, that is, when the eighth rows $M_{18}$ through $M_{58}$ of $M_1$ through $M_5$ are used, these rows can be described by the following.

$$M_{18} = 0000001111111$$
$$M_{28} = 0000001010101$$
$$M_{38} = 0000001001001$$
$$M_{48} = 0101010010001$$
$$M_{58} = 0111101011011$$

The linear transformation vector $W'''_j$ obtained at the output side of the adder 29a when the above row matrix is selected and produced from the memory device 26a according to the value of k, becomes as follows in which the eighth rows of each $W_j$ through $T^{13} \cdot W_j$ are used.

$$W''_j = [a_8 a_7 a_6 a_5 a_4 a_3 a_2 a_1 a_{14} a_{13} a_{12} a_{11} a_{10} a_9]^t$$

Hence, the matrix operation $_8T'^{-1}$ used for obtaining the information vector $W_j$ from the above vector $W''_j$ becomes as shown below, due to the linear transformation circuit 31.

$$_8T^{-1} = \begin{bmatrix} 0000000100000 0 \\ 0000001000000 0 \\ 0000010000000 0 \\ 0000100000000 0 \\ 0001000000000 0 \\ 0010000000000 0 \\ 0100000000000 0 \\ 1000000000000 0 \\ 0000000000000 1 \\ 0000000000001 0 \\ 0000000000010 0 \\ 0000000000100 0 \\ 0000000001000 0 \\ 0000000010000 0 \end{bmatrix}$$

This operational circuit of $_8T'^{-1}$ can be realized by simply interchaning the wiring, and the exclusive-OR circuits are not required. Furthermore, a ROM device is not necessarily required for memorizing (storing) $M_{18}$ through $M_{58}$, and the above matrix operation can be realized by use of a decoder circuit having gates. The first and fourteenth rows in $M_{18}$ through $M_{58}$ do not change, and the second and fourth rows, and third, fifth, and seventh rows respectively are identical. Therefore, the above described matrix operation can be realized by use of a decoder which transforms a code describing $k = 1, - - - , 5$ in three or more bits, for example, into a code comprising the remaining nine rows of $M_{18}$ through $M_{58}$, excluding the rows which do not change and the rows which are identical to another row.

Since the transformation relationship between $W'''_j$ and $W_j$ in this example is regular and relative simple, $W_j$ can also be obtained through the following transformation. That is, by using the fourteenth row matrices of $M_1$ through $M_5$, for example, $$W''_j = \begin{bmatrix} a_{14} \\ a_{13} \\ a_{12} \\ a_{11} \\ a_{10} \\ a_9 \\ a_8 \oplus a_{14} \\ a_7 \oplus a_{13} \\ a_6 \oplus a_{12} \\ a_5 \oplus a_{11} \\ a_4 \oplus a_{10} \\ a_3 \oplus a_9 \\ a_2 \oplus a_8 \oplus a_{14} \\ a_1 \oplus a_7 \oplus a_{13} \end{bmatrix} \overset{\Delta}{=} \begin{bmatrix} a''_1 \\ a''_2 \\ a''_3 \\ \cdot \\ \cdot \\ \cdot \\ \cdot \\ \cdot \\ \cdot \\ \cdot \\ \cdot \\ \cdot \\ \cdot \\ a''_{14} \end{bmatrix}$$

Figure 7:
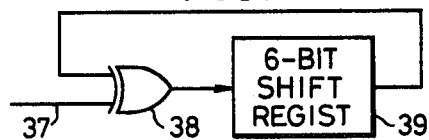
FIG. 7 is a circuit diagram showing an embodiment of a circuit which can be used instead of a linear transformation circuit in the system according to the present invention.

The circuit shown in FIG. 7 is inserted and connected between the adder 29a and the shift register 30 shown in FIG. 5, and the output of the adder 29a is applied to an input terminal 37 shown in FIG. 7. Thus, when a 6-bit shift register 39 is put into a cleared state, and the outputs $a''_1, a''_2, ---$, of the adder 29a the clock pulses CK are successively applied to the shift register 39, $a_{14}, a_{13}, a_{12}, - - -, a_1$ are successively obtained from the output terminal of an exclusive-OR circuit 38.

A third embodiment of an error correcting system according to the present invention is shown in the systematic block diagram in FIG. 8. In FIG. 8, those parts which are the same as those corresponding parts in FIG. 5 is designated by the like reference numerals, and their description will be omitted. In FIG. 8, a data selector 40 selects and passes one of the three inputs supplied thereto, that is, the output $S_1$ of the generating circuit 12, each output words obtained by multiplying $T^{-7}$ of the multiplying circuit 13a, or a zero vector, and applies the input thus selected to a multiplying circuit 24b. This multiplying circuit 24b has a construction in which fourteen AND circuits have been eliminated from the multiplying circuit 24a shown in FIG. 6. Accordingly, the 14-bit parallel input which has passed through the data selector 40, is directly applied to the exclusive-OR circuits indicated by "$\oplus$" in FIG. 6.

When the data selector 40 selects and passes the output of the multiplying circuit 13a, for example, $T^{i-8}\cdot S'_2$ is calculated at the multiplying circuit in this case. However, when the data selector 40 later changes over to select an pass the output $S'_1$ of the generating circuit 12, $S'_1 \oplus T^{i-7}\cdot S'_2$, that is, $S_0$ is claculated at the multiplying circuit 24b. The data selector 40 later changes over to select and pass the zero vector (a general data selecting integrated circuit has a strobe function in addition to the selecting function in which one input is selected from two, four, or eight kinds of inputs, that is, a zero vector is produced as output when the strobe is turned OFF). Hence, the outputs $S_0$, $T\cdot S_0$, - - -, $T^{13}\cdot S_0$ are produced in order from the multiplying circuit 24b. Therefore, according to the present embodiment of the invention, the circuit for multiplying T in order to calculate $S_2$, and the circuit for successively calculating $S_0$, $T\cdot S_0$, - - -, $T^{13}\cdot S_0$ by repetitively multiplying T with $S_0$, can be used in common, by providing the data selector 40. The output of the multiplying circuit 24b is then subjected to similar signal processing operation as that performed in the systematic block diagram in FIG. 5, and thus, the correcting operation is accordingly performed.

Next, a fourth embodiment of an error correcting system according to the present invention in which serial outputs are obtained, will now be described in conjunction with FIG. 9. In FIG. 9, those parts which are the same as those corresponding parts in FIG. 8 will be designated by the like reference numerals, and their description will be omitted.

In FIG. 9, row matrices $M_{18}$ through $M_{58}$ are used, and the output of a multiplying circuit 24c is stored into a register 42 in a case where the correction of a following block is to be performed before the correction of a preceding block is finished. On the other hand, a register 41 stores the output $S_1$ of the generating circuit 12, and also stores the serial output supplied from the adder 29a. This means that the information vector $W_i$ is first obtained serially as output from the register 41, and by storing the calculated information vector $W_j$ supplied from the adder 29a, the information vector $W_j$ is serially obtained as output from the register 41. However, it is necessary in this case to set a line 43 to "0". Furthermore, the arrangement of the elements in the output information vectors $W_i$ and $W_j$ are interchanged in this case (the arrangement is $a_8$ through $a_1$, and $a_{14}$ through $a_9$).

Figure 10:
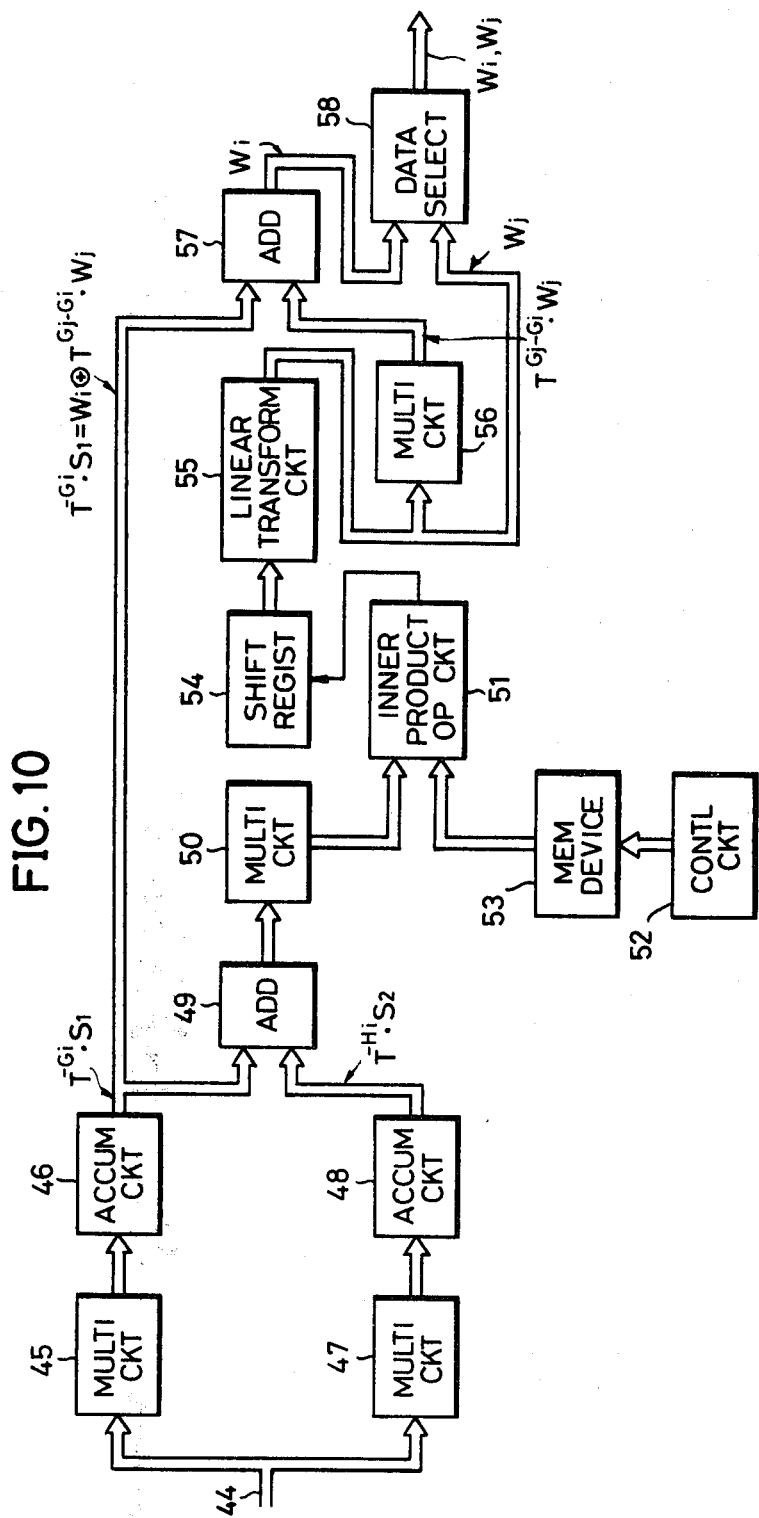
FIG. 10 is a systematic block diagram showing a fifth embodiment of a double error correcting system according to the present invention.

A fifth embodiment of an error correcting system according to the present invention will now be described in conjunction with FIG. 10, in which the error correcting vectors P and Q have been produced by use of the equation (11), and the error correcting vectors P and Q thus produced are received. In FIG. 10, the incoming information vectors $W_1$ through $W_n$ which are applied to an input terminal (data bus) 32, and the error correcting vectors P and Q which are produced by use of the equation (11), are respectively supplied to multiplying circuits 45 and 47. These vectors thus supplied to the multiplying circuit 45 are produced as output in the form $$T^{G_1-Gi}\cdot W_1, T^{G_2-Gi}\cdot W_2, \ldots, T^{G_n-Gi}\cdot W_n, T^{-Gi}\cdot P$$

according to the inputs $W_1$ through $W_n$, and P and Q, from the multiplying circuit 45. On the other hand, outputs $$T^{H_1-Hi}\cdot W_1, T^{H_2-Hi}\cdot W_2, \ldots, T^{H_n-Hi}\cdot W_n, T^{-Hi}\cdot Q$$

are produced from the multiplying circuit 47. These outputs of the multiplying circuits 45 and 47 are respectively applied to accumulating circuits 46 and 48, wherein the vectors thus supplied to these accumulating circuits are successively accumulated and the accumulation of the erroneous vectors $W_i$ and $W_j$ are not performed. Accordingly, $T^{-Gi}\cdot S_1$ and $T^{-Hi}\cdot S_2$ are obtained.

The multiplying circuits 45 and 47 can respectively be realized by use of fixed matrix multiplying circuits which are constructed from exclusive-OR circuits, where the fixed matrix multiplying circuits respectively obtain $T^{-G_{max}}$ and $T^{-H_{max}}$ wherein the maximum of $G_1$ through $G_n$ and $H_1$ through $H_n$ respectively are designated by $G_{max}$ and $H_{max}$, and a circuit as that shown in FIG. 6 which can multiply $T^0$, $T^1$, - - -, $T^{G_{max}}$ or $T^0$, $T^1$, - - -, $T^{H_{max}}$ according to the number of the clock pulses applied thereto. Furthermore, the accumulating circuits 46 and 48 can be realized by use of a circuit shown in FIG. 13.

The above outputs $T^{-Gi}\cdot S_1$ and $T^{-Hi}\cdot S_2$ are respectively added at an adder 49, and thus, $S_0 = (T^{-Gi}\cdot S_1 \oplus T^{-Hi}\cdot S_2)$ is calculated. This $S_0$ thus obtained, is supplied to a multiplying circuit 50 for multiplying $T^L$ (L is an integer other than zero). This multiplying circuit 50 has a circuit construction similar to that shown in FIG. 6. Accordingly, operations are repetitively performed in which $T^L$ is successively multiplied to $S_0$, and the following result is successively obtained.

$$S_0, T^L\cdot S_0, T^{2L}\cdot S_0, \text{---}, T^{(m-1)\cdot}\cdot S_0$$

or $$T^L\cdot S_0, T^{2L}\cdot S_0, \text{---}, T^{mL}\cdot S_0$$

The above column vectors having m elements are supplied to an inner product operation circuit (matrix operation circuit) 51 which is constructed from AND circuits and exclusive-OR circuits. The inner product between the column vector having m elements, and the row matrix having m elements which is a first order combination of a row matrix which is the m-th row of the matrix $(T^{G_j-G_i} \oplus T^{H_j-H_i})^{-1}$ selected by a control circuit 52, is calculated at the above inner product operation circuit 51 according to the combination of i and j supplied from a memory device 53.

Description will now be given on a conventional memory device 62 shown in FIG. 11. In FIG. 11, the memory device 62 stores all the combinations of each of the i and j in the matrices $M_k$. Furthermore, the memory device 62 is controlled by a control circuit 60 which selects a matrix according to the values of the i and j, and a control circuit 61 which successively selects and produces each row matrix formed from the m-th rows of the matrices $M_k$. In addition, a conventional inner product operation circuit 59 calculates the inner product between the output $T^{-Gi}S_1 \oplus T^{-Hi}S_2$ of the adder 49, and the output of the memory device 62. Accordingly, the memory capacity of the memory device 62 is larger than that of the memory device 53, and the number of peripheral circuits of the memory device 62 is large.

Returning to the description of the fifth embodiment of the invention, the serial output of each element $a''_1$, $a''_2, \ldots, a''_m$ of the vector $W''_j$ ($W''_j = Y \cdot W_j$ where Y is an m by m matrix) obtained from the inner product operation circuit 51, is subjected to a serial-to-parallel conversion at a shift register 54 shown in FIG. 10. Furthermore, the output thus converted at the shift register 54 is linearly transformed ($Y^{-1} \cdot W''_j$) at a linear transformation circuit 55, and therefore, the information vector $W_j$ is obtained. This information vector $W_j$ is multiplied with $T^{Gj-Gi}$ at a multiplying circuit 56 which is similar to that shown in FIG. 6, where the matrix multiplication is controlled according to the number of clock pulses. The resulting output of the multiplying circuit 56 is further supplied to an adder 57 wherein $T^{-Gi}S_1 (=W_i \oplus T^{Gj-Gi} \cdot W_j)$ supplied from the accumulating circuit 46 is added to the output supplied from the multiplying circuit 56, to calculate the information vector $W_i$. The above output information vector $W_i$ of the adder 57 and the output information vector $W_j$ of the linear transformation circuit 55, are respectively applied to a data selector 58 wherein the information vectors $W_i$ and $W_j$ are respectively changed over and successively produced as output. These information vectors $W_i$ and $W_j$ are known to be erroneous information vectors due to the error pointers, and the corrected and restored information vectors $W_i$ and $W_j$ are respectively obtained from the data selector 58.

The error correcting method used in the block system shown in FIG. 10 can be realized when the unit matrix I and the matrices $T^L, T^{2L}, \ldots, T^{(m-1)L}$ are linearly independent, or when each of the matrices $T^L, T^{2l}, \ldots, T^{mL}$ are linearly independent. However, the above method is also realizable in a case described in the following.

In order to simplify the construction so that only the matrix $T_L$ is successively multiplied with the vector $S_0$, a zero vector is applied to the multiplying circuit 50 by turning the parallel input OFF excluding the time when the vector $S_0$ is initially stored (or when $T^L \cdot S_0$ is stored). However, when the vector $S_0$ is applied to the parallel input as it is, the output of the multiplying circuit 50 becomes as follows:

$$S_0, (I \oplus T^L) \cdot S_0, (I \oplus T^L \oplus T^{2L}) \cdot S_0, \ldots$$

$$\text{or } T^L \cdot S_0, (T^L \oplus T^{2L}) \cdot S_0, (T^L \oplus T^{2L} \oplus T^{3L}) \cdot S_0, \ldots$$

Similar to the condition of independence for the above matrices $I, T^L, T^{2L}, \ldots$, the correcting opeartion according to the present invention can be performed when m matrices $$I, (I \oplus T^L), (I \oplus T^L \oplus T^{2L}), \ldots$$

$$\text{or } T^L, (T^L \oplus T^{2L}), (T^L \oplus T^{2L} \oplus T^{3L}), \ldots$$

are linearly independent. In this case, the linear transformation circit 55 must be changed according to these matrices.

A sixth embodiment of an error correcting system according to the present invention will now be described in conjunction with FIGS. 12 through 15. In FIGS. 12 through 15, those parts which are the same as those corresponding parts in FIG. 2 are designated by the like reference numerals, and their descriptions will be omitted.

Figure 15:
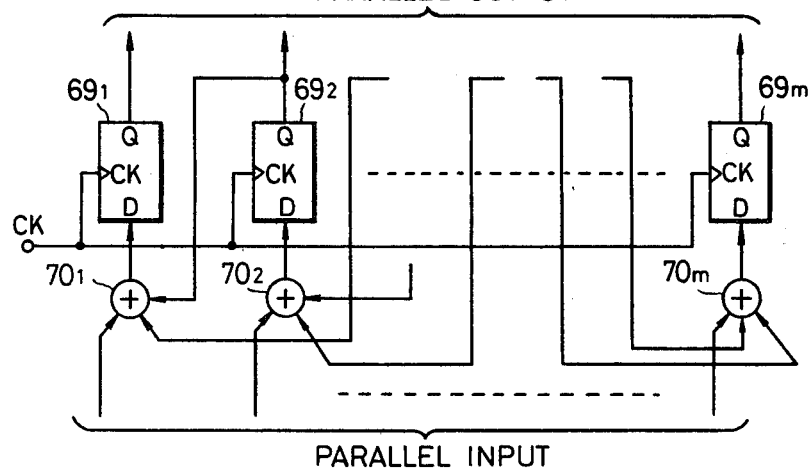
FIG. 15 is a circuit diagram showing an embodiment of still another essential part of the system according to the present invention.
Figure 13:
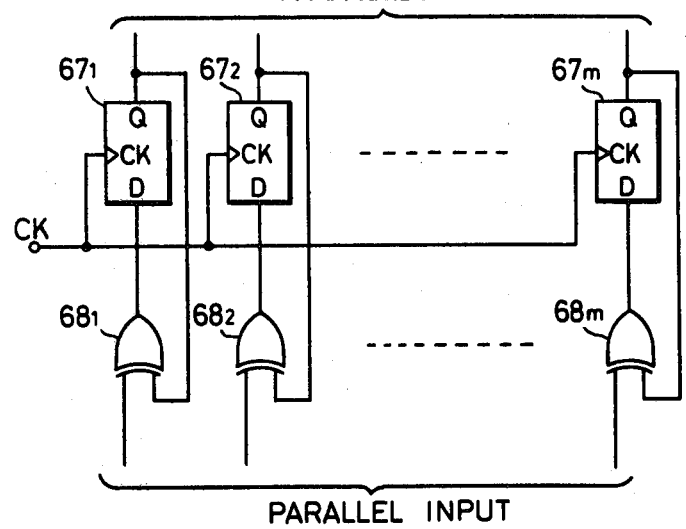
FIG. 13 is a circuit diagram showing an embodiment of an essential part of the system according to the present invention.

The generating circuit 12 comprises exclusive-OR circuits $68_1$ through $68_m$ and registers $67_1$ through $67_m$ as shown in FIG. 13. In addition, the multiplying circuit 13 for multiplying $T^{-n-1}$, comprises exclusive-OR circuits as shown in FIG. 14. FIG. 15 is a circuit diagram showing the construction of the generating circuit 15, and as can be seen from this figure, the generating circuit 15 comprises exclusive-OR circuits $70_1$ through $70_m$ and registers $69_1$ through $69_m$. The output terminal of the generating circuit 15 is connected to the input terminal 11 (the input/output bus of the memory device which performs the de-interleave operation, in the case of the present embodiment of the invention) through a tri-state gate circuit (tri-state circuit) 63. On the other hand, the output terminal of the generating circuit 15 is connected to a gate circuit 64 through the adder 16. The tri-state circuit 63 is a circuit which is constructed so that a high impedance state can be obtained in addition to the high ("1") and low ("0") states. The adder 16 can be realized from only the exclusive-OR circuits $68_1$ through $68_m$, that is, from a circuit excluding the registers $67_1$ through $67_m$ in the circuit shown in FIG. 13. The adder 16 adds $S'_1$ which is a vector in GF(2) having m elements, and $T^{i-n-1} \cdot S_1$, to calculate the vector $S_0$.

Figure 12:
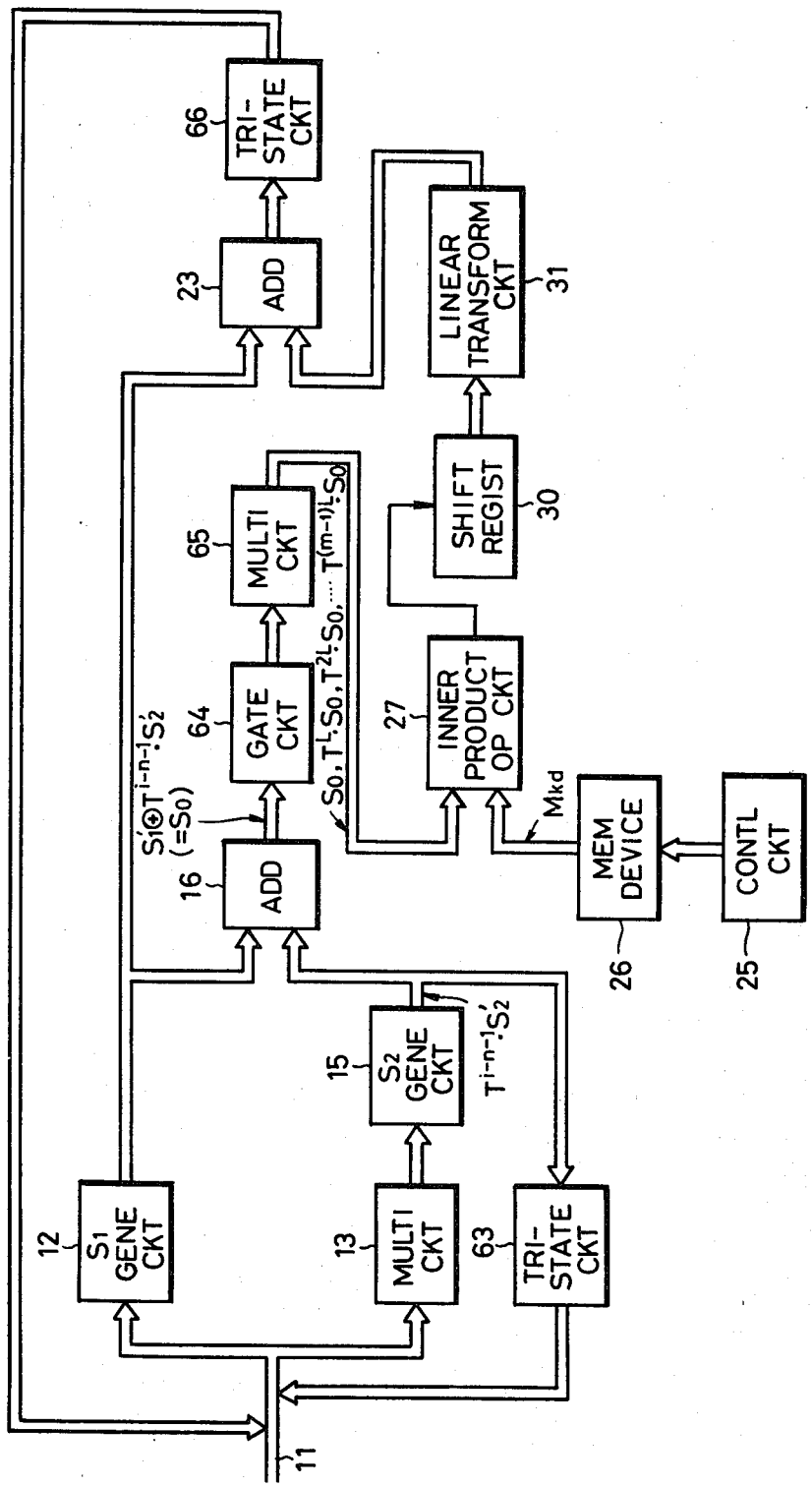
FIG. 12 is a systematic block diagram showing a sixth embodiment of a double error correcting system according to the present invention.

In FIG. 12, when tri-state circuits 63 and 66 are put into high impedance states, and vectors $W_1, W_2, \ldots, W_n, P, Q$ reproduced from a recording medium are successively applied to these tri-state circuits 63 and 66 which are in high impedance states, $S'_1$ and $T^{i-n-1} \cdot S'_2$ are respectively calculated and obtained from the generating circuits 12 and 15. The adder 16 calculates and produces the vector $S_0$ as described above, and this vector $S_0$ thus produced is supplied to a multiplying circuit 65 when the gate circuit 64 comprising m AND gates is closed.

The multiplying circuit 65 is a circuit which repetitively multiplies $T^L$, and stores the vector $S_0$ when one first clock pulse is applied thereto. The gate circuit 64 is then opened so that the output of the gate circuit 64 becomes a zero vector $\phi$ in which all the m elements become zero. Furthermore, one matrix $M_{kd}$ is selected and produced under the control of the control circuit 25 according to the values of i and j, by the memory device 26 (a memory device constructed from a decoding circuit having a ROM device or a gating circuit) which has $(n-1)$ kinds of row matrices $M_{kd}$ which are to be used upon correcting operation stored therein, where $k=1, \text{---}, n-1$. Moreover, when a total of $(m-1)$ clock pulses are further and successively applied to the multiplying circuit 65, $$\begin{cases} S_0, T^L \cdot S_0, \ldots, T^{9m-1)L} \cdot S_0 \\ M_{kd}, M_{kd}, \ldots, M_{kd} \end{cases}$$

are respectively supplied to both input terminals of the inner product operation circuit 27.

The inner product operation circuit 27 is a circuit for calculating the inner product between the row matrices $M_{kd}$ supplied from the memory device 26 and the column vectors $S_0$, $T^L \cdot S_0$, ..., $T^{(m-1)L} \cdot S_0$ supplied from the multiplying circuit 65, and has a construction similar to that shown in FIG. 4. Accordingly, the linearly transformed $W''_j(={}_0T' \cdot W_j)$ is serially produced from the inner product operation circuit 27.

The reproduced information vector $W_i$ which is calculated and produced from the adder 23 is supplied to the input terminal 11 through a tri-state circuit 66, since the tri-state circuit 66 is put into an operational state from a high impedance state. Accordingly, the above reproduced information vector $W_i$ is written into an address location corresponding to that of the original, of a memory device (not shown) which is connected to the input terminal 11. Next, the generating circuit 12 is cleared, and as a result, the output $W_j$ of the linear transformation circuit 31 is produced as the output of the adder 23. This information vector $W_j$ is written into the original address location within the memory device through the tri-state circuit 66, in a similar manner as in the case of the above information vector $W_i$.

Further, in the error correcting system according to the present invention shown in FIG. 12, when only one erroneous word exists, $S'_1$ describes this one erroneous word as it is, that is, $S'_1 = W_i$. Hence, when the linear transformation circuit 31 is cleared, the write-in into the original address location within the memory device can similarly be performed. Moreover, when one word and P of $W_1$ through $W_n$ are in error, $(T^{i-n-1} \cdot S'_2 = W_i)$ is written into the memory device by putting the tri-state circuit 63 into an operational state, since the generating circuit 15 calculates the one erroneous word.

The correcting operation can be performed even when the gate circuit 64 which controls the output $S_0$ is eliminated, in a case where the linear transformation circuit 31 is changed accordingly. That is, the output of the multiplying circuit 65 successively becomes as follows, when the gate circuit 64 is eliminated.

$S_0$, $(I \oplus T^L) \cdot S_0$, $(I \oplus T^L \oplus T^{2L}) \cdot S_0$, ..., $(I \oplus T^L \oplus T^{2L} \oplus ... \oplus T^{(M-1)L}) \cdot S_0$ Accordingly, when m m by m matrices I, $I \oplus T^L$, ..., $I \oplus T^L \oplus ... \oplus T^{(m-1)L}$ are linearly independent from each other, the above I, $I \oplus T^L$, ..., $I \oplus T^L \oplus ... \oplus T^{(m-1)L}$ can be used instead of $T^{L1}$, $T^{L2}$, ..., $T^{Lm}$ described in conjunction with equations (21) through (28). In this case, when the matrix used instead of the above ${}_0T'$ is designated by ${}_0T''$, the linear transformation circuit 31 can accordingly be changed to multiply ${}_0T''^{-1}$ instead of ${}_0T'^{-1}$.

Figure 16:
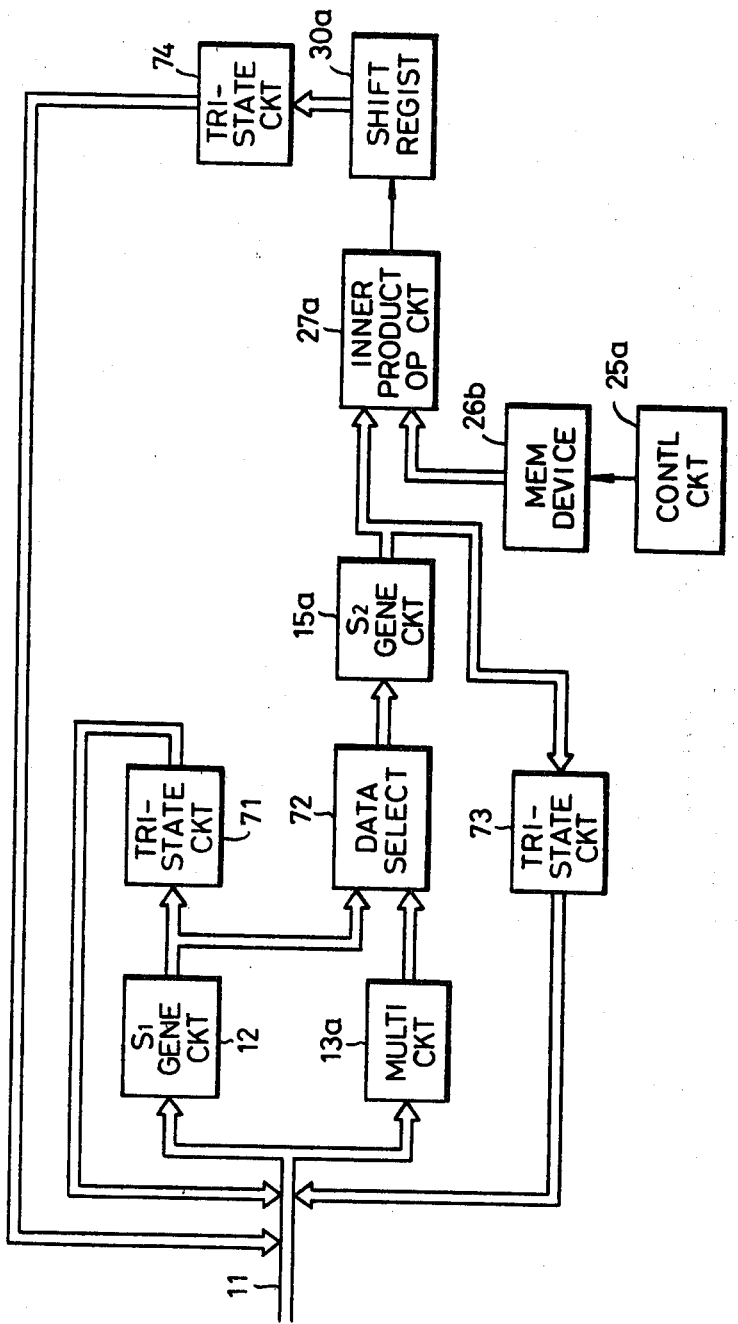
FIG. 16 is a systematic block diagram showing a seventh embodiment of a double error correcting system according to the present invention.

Next, a seventh embodiment of an error correcting system will be described in conjunction with FIG. 16. In FIG. 16, those parts which are the same as those corresponding parts in FIG. 5 will be designated by the like reference numerals, and their description will be omitted.

In the present embodiment of the invention, the information vectors respectively comprise fourteen bits, and eight vectors, that is, six information vectors $W_1$ through $W_6$ and two error cerrecting vectors P and Q, are considered as one block. Upon reproduction of a recording medium in which the eight element vectors are dispersed according to a predetermined rule in terms of vectors and recorded, the above detected dispersion vectors are written into a memory device together with error pointers which indicate the state of said dispersion vectors, that is, whether the vectors are in error or not. After the de-interleave operation is performed to restore the vector column into the original order, the double error correcting operation of adjacent codes is performed by use of the error pointers which indicate which vectors are in error, when two information vectors $W_i$ and $W_j$ within one block are detected as being in error.

A multiplying circuit 27a is a circuit for multiplying $T^{-7}$, and comprises seven exlusive-OR circuits, for example. Since the linear transformation matrix T is a companion matrix of the polynomial $x^{14} + x^8 + 1$ as described above, $T^{-7}$ can be described by the following.

$$T^{-7} = \begin{bmatrix} 0 & 0 & 0 & 0 & 0 & 0 & 1 & 0 & 0 & 0 & 0 & 0 & 0 \\ 1 & 0 & 0 & 0 & 0 & 0 & 0 & 1 & 0 & 0 & 0 & 0 & 0 \\ 0 & 1 & 0 & 0 & 0 & 0 & 0 & 0 & 1 & 0 & 0 & 0 & 0 \\ 0 & 0 & 1 & 0 & 0 & 0 & 0 & 0 & 0 & 1 & 0 & 0 & 0 \\ 0 & 0 & 0 & 1 & 0 & 0 & 0 & 0 & 0 & 0 & 1 & 0 & 0 \\ 0 & 0 & 0 & 0 & 1 & 0 & 0 & 0 & 0 & 0 & 0 & 1 & 0 \\ 0 & 0 & 0 & 0 & 0 & 1 & 0 & 0 & 0 & 0 & 0 & 0 & 1 \\ 1 & 0 & 0 & 0 & 0 & 0 & 1 & 0 & 0 & 0 & 0 & 0 & 0 \\ 0 & 1 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 \\ 0 & 0 & 0 & 0 & 0 & 1 & 0 & 0 & 0 & 0 & 0 & 0 & 0 \\ 0 & 0 & 0 & 0 & 0 & 0 & 1 & 0 & 0 & 0 & 0 & 0 & 0 \end{bmatrix}$$

Furthermore, a data selector 72 selectively controls one of the outputs of the generating circuit 12 and the multiplying circuit 13a. In addition, the data selector 72 is also capable of performing strobe control, and when the strobe is ON, the selected input is produced as output, and a zero vector is produced as output when the strobe is OFF.

A tri-state circuit 73 controls the output of the generating circuit 15, and a tri-state circuit 74 controls the output of a shift register 30a. Row matrices $M_{18}$, $M_{28}$, $M_{38}$, $M_{48}$, and $M_{58}$ respectively having fourteen elements, which are the eighth rows of the fourteen by fourteen matrices $M_1$ through $M_5$, are stored in a memory device 26b, and one of the row matrices $M_{18}$ through $M_{58}$ is selected and produced by a control circuit 25a according to the values of I and j.

When the vectors $W_1$ through $W_6$ and P and Q which are reproduced from the recording medium are successively applied to the input terminal 11, $S_1$ which is equal to $(W_i \oplus W_j)$ is produced. On the other hand, when the strobe is ON in the data selector 72, the output of the multiplying circuit 13a is selectively produced. Thus, the transformed $S'_2$ which is described by the following equation, is supplied to a generating circuit 15a.

$$T^{-7} \cdot S'_2 = T^{-i} \cdot W_i \oplus T^{-j} \cdot W_j$$

Next, the strobe of the data selector 72 is turned OFF, and $(i-1)$ clock pulses are applied to the generating circuit 15a. Therefore, $T^{i-8} \cdot S'_2$ is calculated and produced from the generating circuit 15a. Thus the following equation is obtained.

$$T^{i-8} \cdot S'_2 = T^{-1} \cdot W_i \oplus T^{i-1-j} \cdot W_j$$

Then, the strobe of the data selector 72 is turned ON, and the output of the generating circuit 12 is selected. Accordingly, when one clock pulse is applied to the generating circuit 15a, $S_0$ is calculated by the generating circuit 15a as shown in the following equation.

$$S'_1 \oplus T \cdot T^{i-8} \cdot S'_2 = S'_1 \oplus T^{i-7} \cdot S'_2 = S_0$$

A row matrix $M_{k8}$ respective of the values of i and j is selected by the control circuit 25a, and the strobe of the data selector 72 is turned OFF. Thirteen clock pulses are further successively applied to the generating circuit 15a. Therefore, the output of the generating circuit 15a successively becomes $S_0$, $T \cdot S_0$, $T^2 \cdot S_0$ - - - , $T^{13} \cdot S_0$, and these outputs are supplied to the inner product operation circuit 27a. The inner product operation circuit 27a is constructed in a similar manner as the above described inner product operation circuit 27, and calculates the inner product between the column vector supplied from the generating circuit 15a and the row matrix $M_{k8}$ supplied from the memory device 26b. Each element $a'_1$ through $a'_{14}$ of the vector $W'_j$ is successively and serially produced as output from the inner product operation circuit 27a as shown above with respect to the equation (24), according to the number of clock pulses (zero to thirteen) supplied to the generating circuit 15a. These serial output $a'_1$ through $a'_{14}$ are supplied to the shift register 30a, and undergo serial-to-parallel conversion.

In the present embodiment of the invention, the matrix $_iT'$ in equation (26) becomes $_8T'$, since the above companion matrix T and the row matrices $M_{18}$ through $M_{58}$ are selected. Thus, $_8T'$ can be described by the following.

$$_8T = \begin{bmatrix} 0 0 0 0 0 0 0 1 0 0 0 0 0 0 \\ 0 0 0 0 0 0 1 0 0 0 0 0 0 0 \\ 0 0 0 0 0 1 0 0 0 0 0 0 0 0 \\ 0 0 0 0 1 0 0 0 0 0 0 0 0 0 \\ 0 0 0 1 0 0 0 0 0 0 0 0 0 0 \\ 0 0 1 0 0 0 0 0 0 0 0 0 0 0 \\ 0 1 0 0 0 0 0 0 0 0 0 0 0 0 \\ 1 0 0 0 0 0 0 0 0 0 0 0 0 0 \\ 0 0 0 0 0 0 0 0 0 0 0 0 0 1 \\ 0 0 0 0 0 0 0 0 0 0 0 0 1 0 \\ 0 0 0 0 0 0 0 0 0 0 0 1 0 0 \\ 0 0 0 0 0 0 0 0 0 0 1 0 0 0 \\ 0 0 0 0 0 0 0 0 0 1 0 0 0 0 \\ 0 0 0 0 0 0 0 0 1 0 0 0 0 0 \end{bmatrix}$$

That is, $$W'_j = {_8T} \cdot W_j$$

Accordingly, $$W_j = {_8T^{-1}} \cdot W'_j$$

and the vector $W_j$ can be determined. However, the above $_8T^{-1}$ can also be simplified as in the case of $_8T'$. The linear transformation performed in this case is similar to that performed in the above second embodiment of the invention where in the order of fourteen elements are simply interchanged. Accordingly, the linear transformation from $W'_j$ to $W_j$ is simply performed by interchanging the order of the outputs of the shift register 30a, and supplying these interchanged outputs to the tri-state circuit 74.

The vector $W_j$ thus calculated, is applied to the input terminal 11 under the control performed by the tri-state circuit 74, and then written into an original address location of the memory device where the vector $W_j$ should originally be stored. Furthermore, the calculated vector $W_j$ is simultaneously applied to the generating circuit 12. Hence, when one clock pulse is applied to the generating circuit 12, the generating circuit 12 performs the following operation to calculate the information vector $W_i$.

$$S'_1 \oplus W_j = W_i \oplus W_j \oplus W_j = W_i$$

This information vector $W_i$ thus calculated, is supplied to the input terminal 11 under the control of a tri-state circuit 71, and then written into an original address location of the memory device where the vector $W_i$ should originally be stored. In addition, in cases where only one word is in error or when one word and the error correcting vector P of the vectors $W_1$ through $W_6$ are in error, the correcting operation can be performed in a manner similar to that performed by the block system shown in FIG. 12.

Thus, in the above described sixth and seventh embodiments of the invention, the information vectors read out from the memory device are always corrected vectors, since the corrected information vectors $W_i$ and $W_j$ are stored back into the original address locations within the memory device.

Accordingly, in these sixth and seventh embodiments of the invention, the registers 14 and 17 of the conventional system shown in FIG. 1 are not required, and can be eliminated. Moreover, the circuit used for calculating the partial syndrome $S'_2$ can be used in common with the circuit which multiplies the transformation matrix T.

Further, this invention is not limited to these embodiments but various variations and modifications may be made without departing from the scope of the invention.

What is claimed is:

1. A double error correcting system in a digital signal reproducing apparatus, which transmits information in units of blocks where one block consists of a total of (n+2) vectors, said total of (n+2) vectors being formed from n (n is an integer greater than zero) information vectors $W_1$ through $W_n$, each having m (m is an integer greater than zero) elements in GF(2), where GF(2) represents a finite field consisting of two elements, and two error correcting column vectors P and Q produced by use of said information vectors $W_1$ through $W_n$ and an m by m regular linear transformation matrix T which is linearly independent of a unit matrix I, and said correcting system performing a correcting operation when two erroneous vectors $W_i$ and $W_j$ are detected within one block by use of error pointers which indicate which vectors are in error upon reception of the transmitted information, where it is defined that an m number of m by m matrices $T^{L1}$, $T^{L2}$, . . . $T^{Lm}$ are linearly independent of each other with respect to said transformation matrix T and m integers $L_1, L_2, \ldots, L_m$ which constitute an arithmetical progression, and that $M_k$ is an m by m matrix $(I \oplus T^{i-j})^{-1}$ or $(T^{Gj-Gi} \oplus T^{Hj-Hi})^{-1}$ where symbols "$\oplus$" represent vector addition on GF(2) and k described by an equation k=f(i, j) can assume a plurality of values according to the combination of the values of i and j, and further, that said matrix $M_k$ has m row matrices $M_{k1}$ through $M_{km}$ respectively having m elements, said double error correcting system comprising:

an input terminal for receiving said information vectors $W_1$ through $W_n$ and said error correcting vectors P and Q;

memory means for storing a plurality of row matrices $M_{kd}$ which are formed from certain predetermined row matrices of said row matrices $M_{k1}$ through $M_{km}$ according to each value of k, for selectively reading out said row matrices $M_{kd}$ according to the value of k;

generating circuit means responsive to said information vectors $W_1$ through $W_n$ and said error correcting vectors P and Q received at said input terminal, said generating circuit means generating a column vector $S_0$ which is used for correcting where $S_0 = S_1 \oplus T^{i-n-1} \cdot S_2$ or $T^{-Gi} \cdot S_1 \oplus T^{-Hi} \cdot S_2$, said correction producing partial syndromes $S_1$ and $S_2$ from said information vectors $W_1$ through $W_n$ and said error correcting vectors P and Q by use of predetermined producing equations, to obtain $W_j = M_k \cdot (S_1 \oplus T^{i-n-1} \cdot S_2)$ or $W_j = M_k (T^{-Gi} \cdot S_1 \oplus T^{-Hi} \cdot S_2)$;

multiplying circuit means responsive to the column vector $S_0$ generating from said generating circuit means, for successively multiplying $T^{L1}, T^{L2}, \ldots, T^{Lm}$ to transform column vectors $T^{L1} \cdot S_0, T^{L2} \cdot S_0, \ldots, T^{Lm} \cdot S_0$;

operation circuit means responsive to the output of said memory means and said multiplying circuit, for successively performing a mathematical operation described by $M_{kd} \cdot T^{L1} \cdot S_0, M_{kd} \cdot T^{L2} \cdot S_0, \ldots, M_{kd} \cdot T^{Lm} \cdot S_0$, to serially produce vectors having m elements; and storage circuit means responsive to the serial output of said operation circuit means, for temporarily storing said vectors having m elements which are supplied from said operation circuit means, to perform an m by m linear transformation on said vectors received from said operation circuit means.

2. A double error correcting system as claimed in claim 1 in which said two error correcting vectors P and Q are produced according to the equations, $$\begin{cases} P = W_1 \oplus W_2 \oplus \ldots \oplus W_n \\ Q = T^n \cdot W_1 \oplus T^{n-1} \cdot W_2 \oplus \ldots \oplus T \cdot W_n \\ \quad (\text{or } T \cdot W_1 \oplus T^2 \cdot W_2 \oplus \ldots \oplus T^n \cdot W_n) \end{cases}$$

or $$\begin{cases} P = G^{G1} \cdot W_1 \oplus T^{G2} \cdot W_2 \oplus \ldots \oplus T^{Gn} \cdot W_n \\ Q = T^{H1} \cdot W_1 \oplus T^{H2} \cdot W_2 \oplus \ldots \oplus T^{Hn} \cdot W_n \end{cases}$$

where symbols "$\oplus$" indicate vector addition in GF(2), and said partial syndromes $S_1$ and $S_2$ are produced according to the equations, $$\begin{cases} S_1 = W_1 \oplus W_2 \oplus \ldots \oplus W_n \oplus P \\ S_2 = T^n \cdot W_1 \oplus T^{n-1} \cdot W_2 \oplus \ldots \oplus T \cdot W_n \oplus Q \end{cases}$$

or $$\begin{cases} S_1 = T^{G1} \cdot W_1 \oplus T^{G2} \cdot W_2 \oplus \ldots \oplus T^{Gn} \cdot W_n \oplus P \\ S_2 = T^{H1} \cdot W_1 \oplus T^{H2} \cdot W_2 \oplus \ldots \oplus T^{Hn} \cdot W_n \oplus Q. \end{cases}$$

3. A double error correcting system as claimed in claim 1 in which said two error correcting vectors P and Q are produced according to the equations, $$\begin{cases} P = W_1 \oplus W_2 \oplus \ldots \oplus W_n \\ Q = T^n \cdot W_1 \oplus T^{n-1} \cdot W_2 \oplus \ldots \oplus T \cdot W_n \\ \quad (\text{or } T \cdot W_1 \oplus T^2 \cdot W_2 \oplus \ldots \oplus T^n \cdot W_n) \end{cases}$$

or $$\begin{cases} P = T^{G1} \cdot W_1 \oplus T^{G2} \cdot W_2 \oplus \ldots \oplus T^{Gn} \cdot W_n \\ Q = T^{H1} \cdot W_1 \oplus T^{H2} \cdot W_2 \oplus \ldots \oplus T^{Hn} \cdot W_n \end{cases}$$

where symbols "$\oplus$" indicate vector addition in GF(2), and said partial syndromes $S_1$ and $S_2$ are produced according to the equations, $$\begin{cases} S_1 = W_1 \oplus \ldots \oplus W_{i-1} \oplus \phi \oplus W_{i+1} \oplus \ldots \oplus W_{j-1} \oplus \phi \oplus W_{j+1} \oplus \ldots \oplus W_n \oplus P \\ S_2 = T^n \cdot W_1 \oplus \ldots \oplus T^{n-i+2} \cdot W_{j-1} \oplus \phi \oplus T^{n-i} \cdot W_{i+1} \oplus \ldots \oplus T^{n-j+2} \cdot W_{j-1} \oplus \phi \oplus T^{n-j} \cdot W_{j+1} \oplus \ldots \oplus T \cdot W_n \oplus Q \end{cases}$$

or $$\begin{cases} S_1 = T^{G1} \cdot W_1 \oplus \ldots \oplus T^{Gi-1} \cdot W_{i-1} \oplus \phi \oplus T^{Gi+1} \cdot W_{i+1} \oplus \ldots \oplus T^{Gj-1} \cdot W_{j-1} \oplus \phi \oplus T^{Gj+1} \cdot W_{j+1} \oplus \ldots \oplus T^G \cdot W_n \oplus P \\ S_2 = T^{H1} \cdot W_1 \oplus \ldots \oplus T^{Hi-1} \cdot W_{i-1} \oplus \phi \oplus T^{Hi+1} \cdot W_{i+1} \oplus \ldots \oplus T^{Hj-1} \cdot W_{j-1} \oplus \phi \oplus T^{Hj+1} \cdot W_{j+1} \oplus \ldots \oplus T^{Hn} \cdot W_n \oplus Q \end{cases}$$

by eliminating vectors $W_i$ and $W_j$ which have been indicated as being in error by the error pointers, where symbols "$\phi$" indicate zero vectors.

4. A double error correcting system in a digital signal reproducing apparatus, which transmits information in units of blocks where one block consists of a total of (n+2) vectors, said total of (n+2) vectors being formed from n (n is an integer greater than zero) information vectors $W_1$ through $W_n$ each having m (m is an integer greater than zero) elements in GF(2), where GF(2) represents a finite field consisting of two elements, and two error correcting column vectors P and Q produced by use of said information vectors $W_1$ through $W_n$ and a companion matrix T of a polynominal $1 + g_1 x + g_2 x^2 + \ldots + g_{m-1} x^{m-1} + x^m$ and performs a correcting operation when two erroneous vectors $W_i$ and $W_j$ are detected within one block by use of error pointers which indicate which vectors are in error upon reception of the transmitted information, where it is defined that an m number of m by m matrices T and $T^2, T^3, \ldots, T^m$ or $I, T, T^2, \ldots, T^{m-1}$ are linearly independent of each other with respect to said companion matrix T, and that $M_k$ is an m by m matrix $(I \oplus T^{i-j})^{-1}$ or $(T^{Gj-Gi} \oplus T^{Hj-Hi})^{-1}$ where symbols "$\oplus$" represent vector addition in GF(2) and k described by an equation k=f (i,j) can assume a plurality of values according to the combination of the values of i and j, and further, that said matrix $M_k$ has m row matrices $M_{k1}$ through $M_{km}$ respectively having m elements, said double error correcting system comprising:

an input terminal for receiving said information vectors $W_1$ through $W_n$ and said error correcting vectors P and Q;

memory means for storing a plurality of row matrices $M_{kd}$ which are formed from certain predetermined row matrices of said row matrices $M_{k1}$ through $M_{km}$ according to each value of k, for selectively reading out said row matrices $M_{kd}$ according to the value of k;

generating circuit means responsive to said information vectors $W_1$ through $W_n$ and said error correcting vectors P and Q received at said input terminal, for generating a column vector $S_0$ which is used for the correcting operation where $S_0 = S_1 \oplus T^{i-n-1} \cdot S_2$ or $T^{-Gi} \cdot S_1 \oplus T^{-Hi} \cdot S_2$, by producing partial syndromes $S_1$ and $S_2$ from said information vectors $W_1$ through $W_n$ and said error correcting vectors P and Q by use of predetermined producing equations, to obtain $W_j = M_k(S_1 \oplus T^{i-n-1} \cdot S_2)$ or $W_j = M_k \cdot (T^{-Gi} \cdot S_1 \oplus T^{-Hi} \cdot S_2)$;

multiplying circuit means responsive to the column vector $S_0$ supplied from said generating circuit means, for successively calculating to produce $T \cdot S_0, T^2 \cdot S_0, \ldots T^m \cdot S_0$ or $S_0, T \cdot S_0, \ldots, T^{m-1} \cdot S_0$ by repetitively multiplying said companion matrix T;

operation circuit means responsive to the outputs of said memory means and said multiplying circuit means, for successively performing a mathematical operation described by $$M_{kd} \cdot T \cdot S_0, M_{kd} \cdot T^2 \cdot S_0, \ldots, M_{kd} \cdot T^m \cdot S_0$$

or $M_{kd} \cdot S_0, M_{kd} \cdot T \cdot S_0, \ldots, M_{kd} \cdot T^{m-1} \cdot S_0$ to serially produce vectors having m elements; and storage circuit means responsive to the serial output of said operation circuit means, for temporarily storing said vectors having m elements which are supplied from said operation circuit means, to perform an m by m linear transformation on said vectors thus supplied from said operation circuit.

5. A double error correcting system as claimed in claim 4 in which said two error correcting vectors P and Q are produced according to the equations, $$\begin{cases} P = W_1 \oplus W_2 \oplus \ldots \oplus W_n \\ Q = T^n \cdot W_1 \oplus T^{n-1} \cdot W_2 \oplus \ldots \oplus T \cdot W_n \\ \quad (\text{or } T \cdot W_1 \oplus T^2 \cdot W_2 \oplus \ldots \oplus T^n \cdot W_n) \end{cases}$$

or $$\begin{cases} P = T^{G1} \cdot W_1 \oplus T^{G2} \cdot W_2 \oplus \ldots \oplus T^{Gn} \cdot W_n \\ Q = T^{H1} \cdot W_1 \oplus T^{H2} \cdot W_2 \oplus \ldots \oplus T^{Hn} \cdot W_n \end{cases}$$

where symbols "$\oplus$" indicate vector addition in GF(2), and said partial syndromes $S_1$ and $S_2$ are produced according to the equations, $$S_1 = W_1 \oplus W_2 \oplus \ldots \oplus W_n \oplus P$$

$$S_2 = T^n \cdot W_1 \oplus T^{n-1} \cdot W_2 \oplus \ldots \oplus T \cdot W_n \oplus Q$$

or $$S_1 = T^{G1} \cdot W_1 \oplus T^{G2} \cdot W_2 \oplus \ldots \oplus T^{Gn} \cdot W_n \oplus P$$

$$S_2 = T^{H1} \cdot W_1 \oplus T^{H2} \cdot S_2 \oplus \ldots \oplus T^{Hn} \cdot W_n \oplus Q.$$

6. A double error correcting system as claimed in claim 4 in which said two error correcting vectors P and Q are produced according to the equations, $$\begin{cases} P = W_1 \oplus W_2 \oplus \ldots \oplus W_n \\ Q = T^n \cdot W_1 \oplus T^{n-1} \cdot W_2 \oplus \ldots \oplus T \cdot W_n \\ \quad (\text{or } T \cdot W_1 \oplus T^2 \cdot W_2 \oplus \ldots \oplus T^n \cdot W_n) \end{cases}$$

or $$\begin{cases} P = T^{G1} \cdot W_1 \oplus T^{G2} \cdot W_2 \oplus \ldots \oplus T^{Gn} \cdot W_n \\ Q = T^{H1} \cdot W_1 \oplus T^{H2} \cdot W_2 \oplus \ldots \oplus T^{Hn} \cdot W_n \end{cases}$$

where symbols "$\oplus$" indicate vector addition in GF(2), and said partial syndromes $S_1$ and $S_2$ are produced according to the equations, $$S_1 = W_1 \oplus \ldots \oplus W_{i-1} \oplus \phi \oplus W_{i+1} \oplus \ldots$$
$$\oplus W_{j-1} \oplus \phi \oplus W_{j+1} \oplus \ldots \oplus W_n \oplus P$$

$$S_2 = T^n \cdot W_1 \oplus \ldots \oplus T^{n-i+2} \cdot W_{i-1} \oplus T^{n-i} \cdot W_{i+1} \oplus \ldots$$
$$\oplus T^{n-j+2} \cdot W_{j-1} \oplus \phi \oplus T^{n-j} \cdot W_{j+1} \oplus \ldots$$
$$\oplus T \cdot W_n \oplus Q$$

or $$S_1 = T^{G1} \cdot W_1 \oplus \ldots$$
$$\oplus T^{Gi-1} \cdot W_{i-1} \oplus \phi \oplus T^{Gi+1} \cdot W_{i+1} \oplus \ldots$$
$$\oplus T^{Gj-1} \cdot W_{j-1} \oplus T^{Gj+1} \cdot W_{j+1} \oplus \ldots \oplus T^{Gn} \cdot W_n \oplus P$$

$$S_2 = T^{H1} \cdot W_1 \oplus \ldots$$
$$\oplus T^{Hi-1} \cdot W_{i-1} \oplus \phi \oplus T^{Hi+1} \cdot W_{i+1} \oplus \ldots$$
$$\oplus T^{Hj-1} \cdot W_{j-1} \oplus \phi \oplus T^{Hj+1} \cdot W_{j+1} \oplus \ldots$$
$$\oplus T^{Hn} \cdot W_n \oplus Q$$

by eliminating vectors $W_i$ and $W_j$ which have been indicated as being in error by the error pointers, where symbols "$\phi$" indicate zero vectors.

7. A double error correcting system as claimed in claim 4 in which said generating circuit means comprise a first circuit responsive to said vectors $W_1$ through $W_n$ and P and Q received from said input terminal for producing said partial syndrome $S_1$, a second circuit means also responsive to said vectors $W_1$ through $W_n$ and P and Q received from said input terminal for multiplying $T^{-n+1}$ thereto, and data selector means responsive to outputs of said first and second circuit means for successively changing over to produce the output of said second circuit means, the output of said first circuit means, and a zero vector.

8. A double error correcting system as claimed in claim 4 in which said information vectors $W_1$ through $W_n$ respectively have fourteen elements where n=6, and said companion matrix T is a companion matrix of a polynominal $1 + x^8 + x^{14}$.

9. A double error correcting system in a digital signal reproducing apparatus for reproducing a recording medium, said recording medium being recorded in units of vectors wherein (n+2) element vectors (n is an integer greater than zero) of one block are dispersed according to a predetermined rule, said one block consisting of a total of (n+2) vectors formed from n information vectors $W_1$ through $W_n$ each having m (m is an integer greater than zero) elements obtained according to a predetermined rule, and two error correcting vectors P and Q produced by use of said information vectors $W_1$ through $W_n$ and equations $$P = W_1 \oplus W_2 \oplus \ldots \oplus W_n$$

$$Q = T^n \cdot W_1 \oplus T^{n-1} \cdot W_2 \oplus \ldots \oplus T \cdot W_n$$

where symbols "$\oplus$" indicate vector additions in GF(2), where GF(2) represents a finite field having two elements, and T indicates an m by m regular linear transformation matrix in GF(2), where it is assumed that the information vector having m elements is one of a digital signal column obtained by sampling and quantizing analog information signals every predetermined period, said digital signal reproducing apparatus writing in the detected dispersed digital signals into a memory circuit together with error pointers which indicate whether a vector is in error or not, to perform a correcting operation when two erroneous vectors $W_i$ and $W_j$ are detected within one block by use of said error pointers after an operation is performed to restore the order of the vector column into the original order upon reproduction of said recording medium, and where it is defined that an m number of m by m matrices $T^{L_1}$, $T^{L_2}$, ..., $T^{L_m}$ are linearly independent from each other with respect to said transformation matrix T and m integers $L_1$, $L_2$, ..., $L_m$ which construct an arithmetical progression, and that $M_k$ are (n−1) m by m matrices $(I \oplus T^{i-j})^{-1}$ where k=i−j=1, ..., n−1, and further, that said matrices $M_k$ have m row matrices $M_{k1}$ through $M_{km}$ respectively having elements, said double error correcting system comprising:

an input terminal for receiving said information vectors $W_1$ through $W_n$ and said error correcting vectors P and Q;

memory means for pre-storing each element of (n−1) row matrices $M_{1d}$ through $M_{(n-1)d}$ which are formed from certain predetermined row matrices of said row matrices $M_{k1}$ through $M_{km}$ for selectively reading out said row matrices $M_{1d}$ through $M_{(n-1)d}$;

generating circuit means responsive to said information vectors $W_1$ through $W_n$ and said error correcting vectors P and Q received through said input terminal, for generating a column vector $S_0$ which is used for the correcting operation where $S_0 = S_1 \oplus T^{i-n-1} \cdot S_2$, by producing partial syndromes $S_1$ and $S_2$ from said information vectors $W_1$ through $W_n$ and said error correcting vectors P and Q by use of equations $$S_1 W_1 \oplus W_1 \oplus \ldots W_n \oplus P$$

$$S_1 = T^n \cdot W_1 \oplus T^{n-1} \cdot W_2 \oplus \ldots \oplus T \cdot W_n \oplus Q$$

or by eliminating vectors $W_1$ and $W_j$ which are indicated by said error pointers as being in error to add zero vectors in which all the m elements are zero instead of $W_i$, $W_j$, $T^{n+1-j} \cdot W_i$, and $T^{n+1-j} \cdot W_j$ in the above equations, to obtain $W_j = M_k$, $(S_1 \oplus T^{i-n-1} \cdot S_2)$;

multiplying circuit means responsive to the column vector $S_0$ generated from said generating circuit means, for successively multiplying $T^{L_1}$, $T^{L_2}$, ..., $T^{L_m}$ to produce transformed column vectors $T^{L_1} \cdot S_0$, $T^{L_2} \cdot S_0$, ..., $T^{L_m} \cdot S_0$;

operation circuit means responsive to the outputs of said memory means and said multiplying circuit means, for successively performing a mathematical operation described by $M_{kd}$, $T^{L_1} \cdot S_0$, $M_{kd} \cdot T^{L_2} \cdot S_0$, ..., $M_{kd} \cdot T^{L_m} \cdot S_0$, to serially produce vectors having m elements;

linear transformation circuit means responsive to the output of said operation circuit means, for obtaining the vector $W_j$ having m elements by linearly transforming the output of said operation circuit means according to a linear transformation rule determined by certain row matrices of the matrices $M_{kd}$; and write-in means for writing said vector $W_j$ having m elements into the original location within said memory means wherein $W_j$ was stored, and also adding said partial syndrome $S_1$ ($S_1 = W_i \oplus W_j$) and $W_j$ to obtain the information vector $W_i$ to write said $W_i$ into the original location within said memory means wherein $W_i$ was stored.

* * * * *

UNITED STATES PATENT AND TRADEMARK OFFICE
CERTIFICATE OF CORRECTION

PATENT NO. : 4,416,010

DATED : November 15, 1983

INVENTOR(S) : Chitoshi Hibino, Harukuni Kobari, Susumu Suzuki and Yasuhiro Yamada It is certified that error appears in the above-identified patent and that said Letters Patent is hereby corrected as shown below:

Column 27, line 16, change "generating" (first occurrence) to --generated--;

line 20, change "output" to --outputs--.

Signed and Sealed this

Twenty-eighth Day of February 1984

[SEAL]

Attest:

GERALD J. MOSSINGHOFF

Attesting Officer

Commissioner of Patents and Trademarks